United States Patent [19]
Kitazawa et al.

[11] Patent Number: 5,721,989
[45] Date of Patent: Feb. 24, 1998

[54] CAMERA HAVING A MODE MEMORY DEVICE

[75] Inventors: Toshiyuki Kitazawa; Satoshi Nakano, both of Tokyo, Japan

[73] Assignee: Asahi Kogaku Kogyo Kabushiki Kaisha, Tokyo, Japan

[21] Appl. No.: 835,195

[22] Filed: Apr. 7, 1997

Related U.S. Application Data

[63] Continuation of Ser. No. 440,333, May 12, 1995, abandoned.

[30] Foreign Application Priority Data

| May 13, 1994 | [JP] | Japan | 6-100287 |
| May 13, 1994 | [JP] | Japan | 6-100288 |
| May 16, 1994 | [JP] | Japan | 6-101421 |
| May 16, 1994 | [JP] | Japan | 6-101422 |
| May 16, 1994 | [JP] | Japan | 6-101423 |

[51] Int. Cl.⁶ ........................................ G03B 17/18
[52] U.S. Cl. ........................................ 396/280; 396/299
[58] Field of Search ........................... 396/280, 297, 396/298, 299

[56] References Cited

U.S. PATENT DOCUMENTS

| 4,853,733 | 8/1989 | Watanabe et al. | 354/412 |
| 5,018,017 | 5/1991 | Sasaki et al. | 358/209 |
| 5,060,007 | 10/1991 | Egawa | 354/430 |
| 5,075,710 | 12/1991 | Taniguchi et al. | 354/289.12 |
| 5,298,936 | 3/1994 | Akitake et al. | 354/471 |
| 5,479,237 | 12/1995 | Kitaoka | 354/474 |
| 5,485,238 | 1/1996 | Miura et al. | 354/289.12 |

*Primary Examiner*—David M. Gray
*Attorney, Agent, or Firm*—Sughrue, Mion, Zinn, Macpeak & Seas, PLLC

[57] ABSTRACT

A camera including a main switch which turns on/off a power supply, and a first memory unit for storing a mode/function which is selected from changeable modes/functions to be used in photography. The camera further includes a second memory unit for storing the changeable modes/functions separately from the first memory unit, and a mode call switch for calling the modes/functions stored in the second memory unit, the mode call switch being interlocked with the main switch.

82 Claims, 21 Drawing Sheets

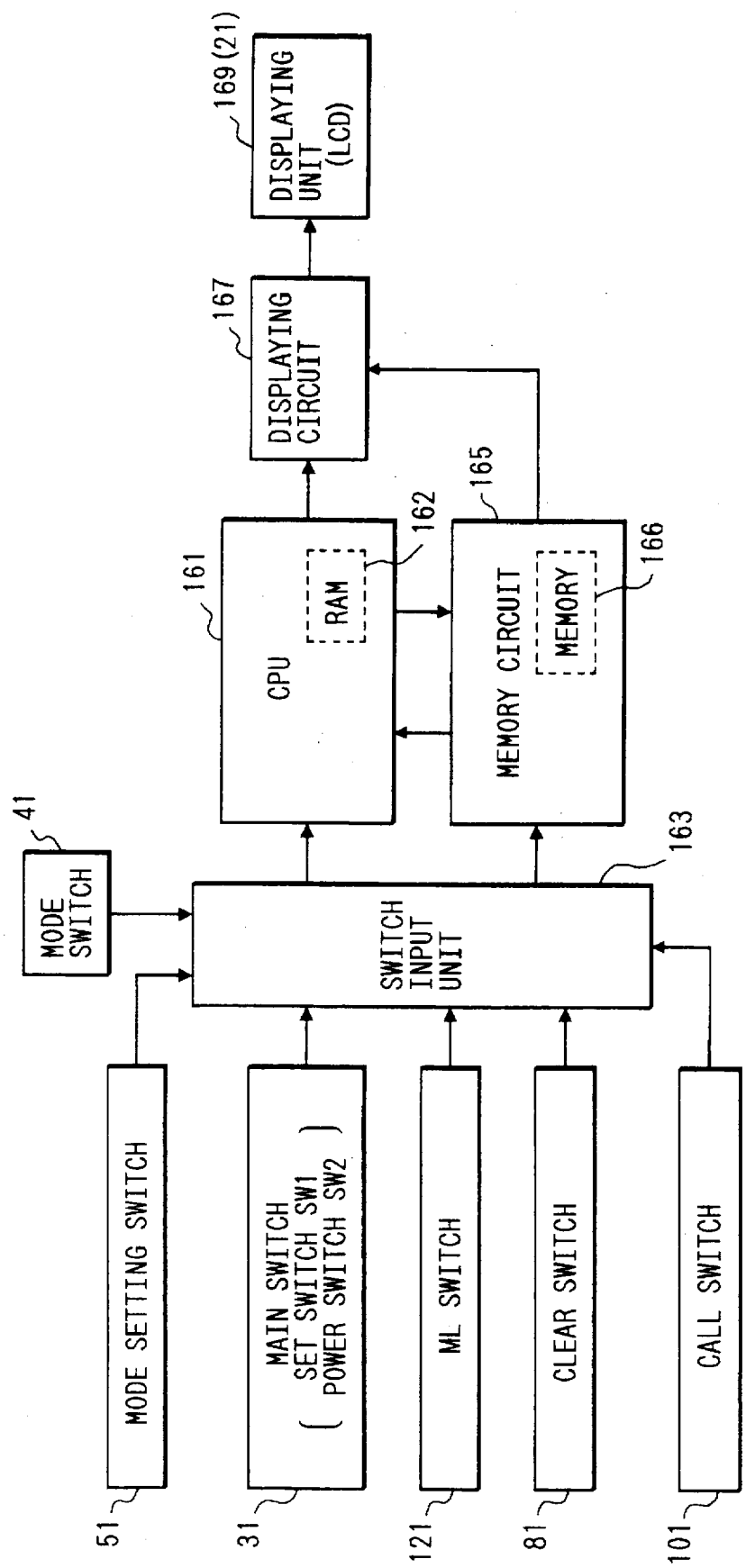

CAMERA HAVING A MODE MEMORY DEVICE

This is a Continuation of application Ser. No. 08/440,333 filed May 12, 1995, now abandoned.

BACKGROUND OF THE INVENTION

1. Field of the Invention

The invention relates to a camera including memory means for storing a faculty which is selected by the photographer from a plurality of selectable modes/functions such as an exposure mode, a drive mode, and the like camera faculties, and call means for calling stored faculties.

2. Description of the Related Art

Recently, cameras, particularly single-lens reflex cameras have been provided with modes/functions, such as many photograph modes, which can be selected by the photographer. Such selectable modes/functions include an exposure mode, a drive mode, etc. The exposure mode includes an automatic exposure mode, and a manual exposure mode. The automatic exposure mode includes a full-automatic program exposure mode, and a semi-automatic exposure mode including a shutter-priority exposure mode and an aperture-priority exposure mode. The program exposure mode includes many kinds of program exposure modes such as a normal program exposure mode, a fast shutter priority exposure mode, and a depth-of-field priority exposure mode. These modes/functions are usually stored in a ROM of a camera. Faculties which have been selected, changed or set are stored in memory means such as a RAM. In photography, a required faculty is called by control means for controlling the faculties of the camera, usually a microcomputer, and a photographic process is then conducted on the basis of the called mode/function.

Conventionally, such a camera is configured so that the modes/functions are selected, changed or set by operating an exclusive switch button, and faculties stored in the memory means are similarly called by operating another exclusive switch button. When a mode/function is once changed to another one, in order to return the setting to the mode/function set before the change or to the initial mode/function which is preset in the camera, operations similar to those conducted in the change must be repeated.

Furthermore, in order to obtain different combinations of modes/functions, an operation of changing each of the modes/functions to be changed is conducted, and such an operation must be repeated on all the modes/functions. When a combination of modes/functions is once changed, furthermore, it is not easy to return the setting to the original combination.

SUMMARY OF THE INVENTION

It is an object of the invention to provide a camera in which a mode/function set by the photographer can be called without using an exclusive operation member the modes before and after change can be stored in a reduced amount of space, and the modes before and after change can easily be interchanged with each other.

It is another object of the invention to provide a camera in which a mode/function set by the photographer can be stored without using an exclusive operation member and in a reduced amount of space, the mode/function is prevented from being accidentally stored, and the mode/function can easily be stored.

It is a further object of the invention to provide a camera in which a part of or the whole of a mode/function selected or set by the photographer can be changed at a time to a specific initial mode/function.

It is a still further object of the invention to provide a camera which, in addition to mode memory means for storing modes/functions which are used in conventional display and photography, includes memory means in which only a mode/function desired by the photographer can be stored and from which only the mode/function can be called.

It is a still further object of the invention to provide a camera in which a plurality of sets of modes/functions selected or set by the photographer can be stored and can easily be called.

In order to attain the objects, the invention provides a camera including: a main switch for turning on/off a power supply; first memory means for storing a mode/function which is selected from changeable modes/functions to be used in photography; second memory means for storing the changeable modes/functions separately from the first memory means; and a mode call switch for calling the mode/function stored second memory means, the mode call switch being interlocked with the main switch.

The invention provides a camera including: a main switch for turning on/off a power supply; first memory means for storing a mode/function which is selected from changeable modes/functions to be used in photography; second memory means for storing the mode/function stored in the first memory means, separately from the first memory means; memory switch means for writing the mode/function stored in the first memory means, into the second memory means; a mode call switch for calling the mode/function stored in the second memory means, the mode call switch being interlocked with the main switch; and control means for, when the mode/function is called from the second memory means in response to an operation of the mode call switch, executing a photographic process on the basis of the called mode/function, and for, when the call is not done, executing a photographic process on the basis of the mode/function stored in the first memory means.

The invention provides a camera including: mode selection means for selecting a mode/function from changeable modes/functions; first memory means for storing the mode/function selected by the mode selection means, as a mode/function to be used in photography; second memory means for storing the mode/function stored in the first memory means, separately from the first memory means; and control means for conducting a storage operation on the second memory means during a selection process conducted by the mode selection means.

The invention provides a camera including: mode selection means for selecting a mode/function from changeable modes/functions; memory means for storing the mode/function selected by the mode selection means; and rewrite means for rewriting at a time a part of or the whole of the mode/function stored in the memory means, to a specific initial mode/function respectively.

The invention provides a camera including: mode selection means for selecting a mode/function from changeable modes/functions; first memory means for storing the mode/function selected by the mode selection means, as a mode/function to be used in photography; second memory means for storing the mode/function stored in the first memory means, separately from the first memory means; call means for calling the mode/function stored in the second memory means, to use the called mode/function in photography; and rewrite means for rewriting at a time a part of or the whole of the mode/function stored in the second memory means, to a specific initial mode/function respectively.

The invention provides a camera including: mode selection means for selecting one or more modes/functions from changeable modes/functions; memory means for storing one or more modes/functions selected by the mode selection means; and control means for causing the memory means to store only one or more changed modes/functions during a period when the mode selection means conducts a mode/function selection process.

The invention provides a camera including: mode selection means for selecting a mode/function from changeable modes/functions; first memory means for storing the mode/function selected by the mode selection means, as a mode/function to be used in photography; second memory means for storing the mode/function stored in the first memory means, separately from the first memory means; control means for causing the second memory means to store only one or more changed modes/functions during a period when the mode selection means conducts a mode/function selection process; and switch means for, in response to an external operation, causing the control means to execute the storage operation.

The invention provides a camera including: mode selection means for, in response to an external operation, changing modes/functions which are changeable; memory means for independently storing a plurality of combinations of modes/functions selected by the mode selection means; and call means for alternatively calling the combinations of modes/functions stored in the memory means.

The invention provides a camera including: mode selection means for selecting a mode/function from changeable modes/functions; first memory means for storing the mode/function selected by the mode selection means, as a mode/function to be used in photography; second memory means for independently storing a plurality of combinations of modes/functions selected by the mode selection means; and call means for alternatively calling the combinations of modes/functions stored in the second memory means in the unit of a combination, as modes/functions to be used in photography.

BRIEF DESCRIPTION OF THE DRAWINGS

FIG. 17 is a block diagram showing an example of the circuit configuration of the camera;

DETAILED DESCRIPTION OF THE PREFERRED EMBODIMENTS

First Embodiment

Figure 1:
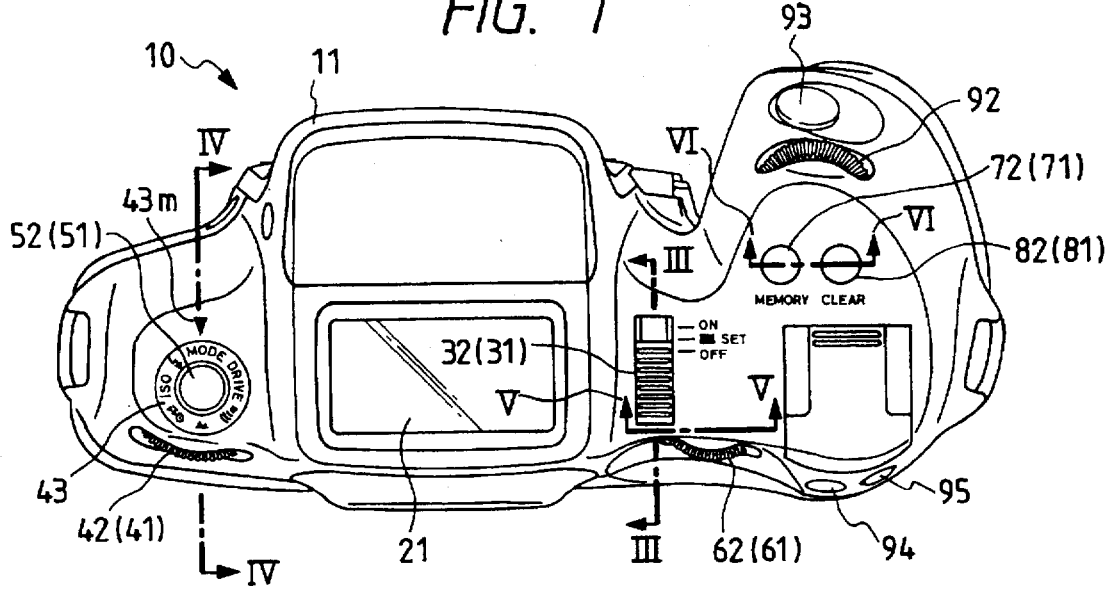
FIG. 1 is a plan view of the camera body of a single-lens reflex camera of a first embodiment of the invention, as seen from the photographer.
Figure 2:
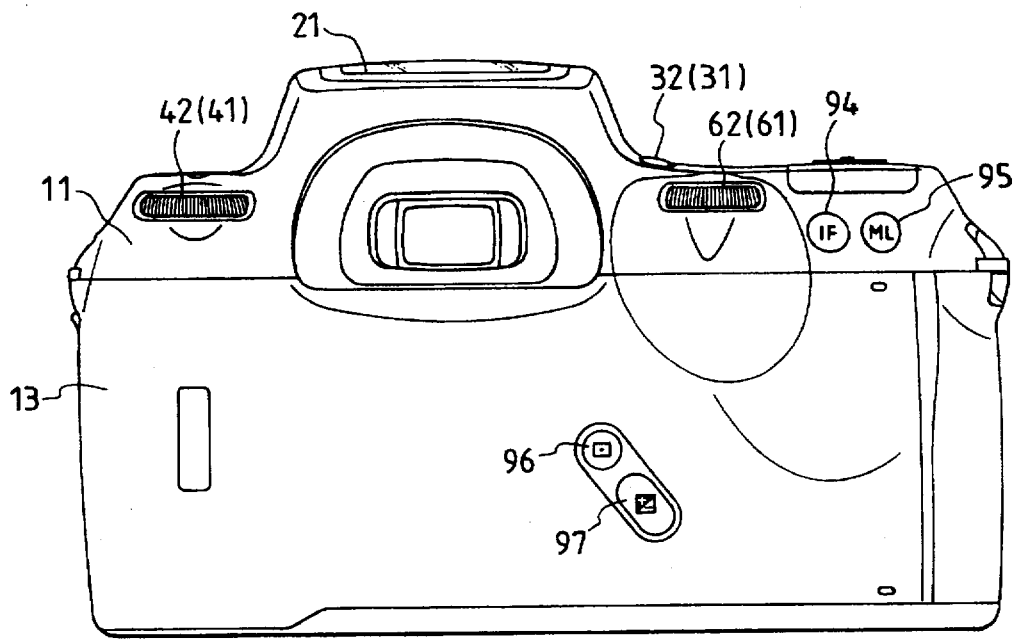
FIG. 2 is a rear view of the camera body.

The appearance of a single-lens reflex camera of a first embodiment of the invention, and the structure of operation means of the camera will be described with reference to FIGS. 1 and 2. FIG. 1 is a plan view showing the camera body of the single-lens reflex camera of the first embodiment of the invention, as seen from the photographer, and FIG. 2 is a rear view of the camera body.

The camera body 10 has an upper decorative cover 11 on which principal operation members are mounted. A liquid crystal display (LCD) panel 21 which functions as the display means for displaying a photographic mode and the like is mounted at a left-of-center portion of the upper surface of the upper decorative cover 11. A slide operating unit 32 of a main switch 31 is mounted in the right side of the LCD panel 21. The slide operating unit 32 functions also as the operating unit of the mode call switch. A mode setting dial 42 of a mode change switch 41, an indication ring 43, and a setting button 52 of a mode setting switch 51 are coaxially mounted in the left side of the LCD panel 21. The mode setting dial 42 is partly exposed from the back surface of the upper decorative cover 11, and the indication ring 43 and the setting button 52 are exposed from the upper surface of the upper decorative cover 11.

A memory button 72 of a memory switch 71, and a clear button 82 of a clear switch 81 are mounted at the right-front of the main switch 31. A rotatable TV operating dial 92 of a TV electronic dial switch, and a shutter button 93 are mounted in front of these buttons.

A rotatable AV operating dial 62 of an AV electronic dial switch 61 is mounted on the back surface of the upper decorative cover 11 and in the side of the slide operating unit 32 in such a manner that the AV operating dial is exposed from the back surface of the upper decorative cover 11. An IF button 94 and an ML button 95 are mounted to the side of the AV operating dial 62. A photometric mode selecting button 96 and an exposure correcting button 97 are mounted on a back cover 13.

The structures of the main switch 31, the mode change switch 41, the mode setting switch 51, the AV electronic dial switch 61, the memory switch 71 and the clear switch 81 will be described in more detail with reference to FIGS. 4 to 7.

Figure 3:
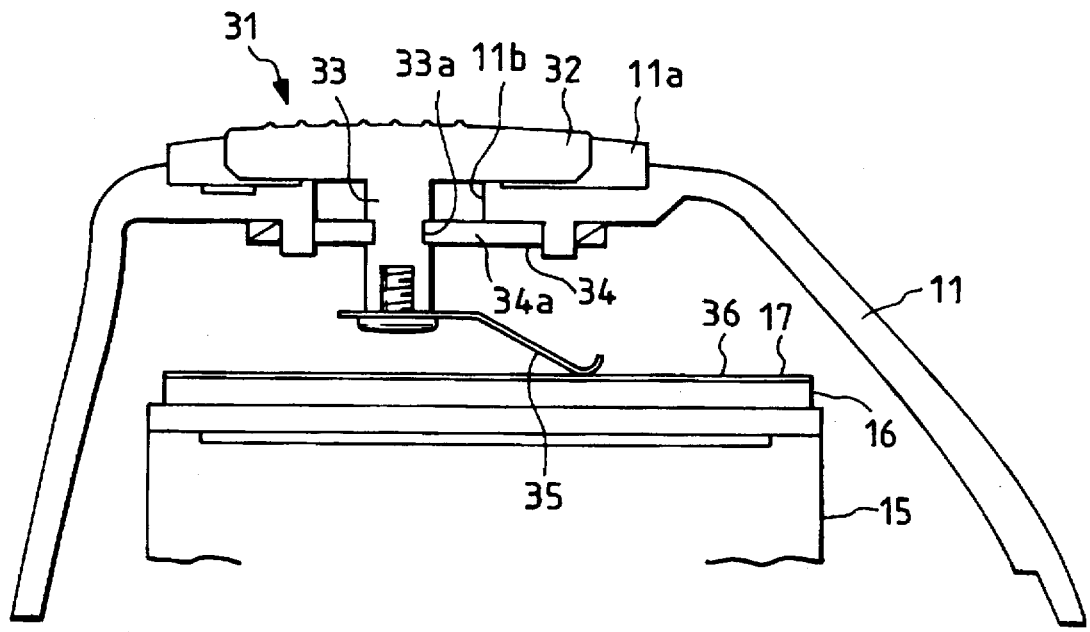
FIG. 3 is a partial section view taken along line III—III of FIG. 1.

FIG. 3 is a partial section view showing the structure of the main switch 31 and taken along line III—III of FIG. 1. The main switch 31 includes the slide operating unit 32, and an interlocking leg 33 projecting from the inner surface of the slide operating unit 32. The slide operating unit 32 is housed so as to be slidable in the back and forth directions of the camera body 10, in a guide groove 11a which is formed on the upper decorative cover 11 and elongates in the back and forth directions. A slot 11b elongating in the back and forth directions is formed in the bottom surface of the guide groove 11a. The interlocking leg 33 is movably fitted into the slot 11b. A guide plate 34 is fixed at a position where the guide plate can close the slot 11b. Also formed in the guide plate 34, is a slot 34a elongating in the back and forth directions. A groove 33a formed on the interlocking leg 33 is slidably fitted onto side edge portions defining the slot 34a. The fitting of the groove 33a onto the edge portions of the slot 34a allows the slide operating unit 32 to be freely moved in the back and forth directions, and prevents the unit from slipping off from the upper decorative cover 11.

Figure 8:
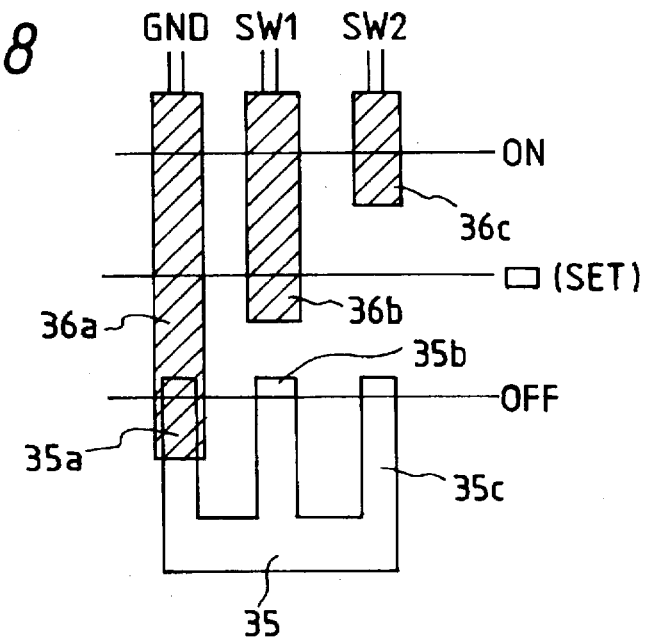
FIG. 8 is a view showing the contact structure of a main switch.

A contact brush 35 is fixed by a screw to a tip portion of the interlocking leg 33 which projects in the camera body through the slot 34a. The contact brush 35 includes three fork-like sliding contacts 35a, 35b and 35c which are electrically connected to each other. The sliding contacts 35a, 35b and 35c are respectively opposed to pattern contacts 36a, 36b and 36c formed on a flexible printed circuit board 17, so as to be slidable on the pattern contacts (see FIG. 8). The flexible printed circuit board 17 is fixed to a body block 15 in the camera body 10 through a base plate 16. The pattern contacts 36a, 36b and 36c elongate in the moving directions of the sliding contacts 35a, 35b and 35c so as to slidingly contact with the sliding contacts, respectively.

Although not shown, the pattern contacts 36a to 36c are formed at ends of conductor portions so that, via the conductor portions, the pattern contact 36a is connected to a ground terminal of the power supply switch which is not shown, and the pattern contacts 36b and 36c are connected to switch input terminals of a switch input unit 163 which will be described later. The flexible printed circuit board 17 elongates along a predetermined route in the camera body 10, and conductor portions of the circuit board are connected to corresponding input terminals of the switch input unit 163.

The contacts 35a and 36a, and the contacts 35b and 36b constitute a set switch SW1 which functions as the mode call switch, and the contacts 35c and 36c constitute a power switch SW2.

Among the sliding contacts 35a to 35c and the pattern contacts 36a to 36c, when the main switch 31 is in the initial state (the slide operating unit 32 is at the OFF position), only the sliding contact 35a and the pattern contact 36a are contacted to each other to make an electrical connection, and the other contacts, the sliding contacts 35b and 35c and the pattern contacts 36b and 36c are in a non-contact state or in an electrically non-conductive (OFF) state. In other words, the set switch SW1 and the power switch SW2 are being turned off.

When the slide operating unit 32 is slid forward to reach a second position (set position) (the second state of the main switch 31), the sliding contact 35b is contacted to the pattern contact 36b to make an electrical connection, so that the set switch SW1 is turned on.

When the slide operating unit 32 is slid further forward to reach a third position (power-on position) (the third state of the main switch 31), the sliding contact 35c is contacted to the pattern contact 36c to make an electrical connection, so that the power switch SW2 is turned on. The sliding contact 35a and the ground contact 36a always make an electrical connection, and the sliding contact 35b and the pattern contact 36b are maintained so as to make an electrical connection between the second and third positions.

Figure 4:
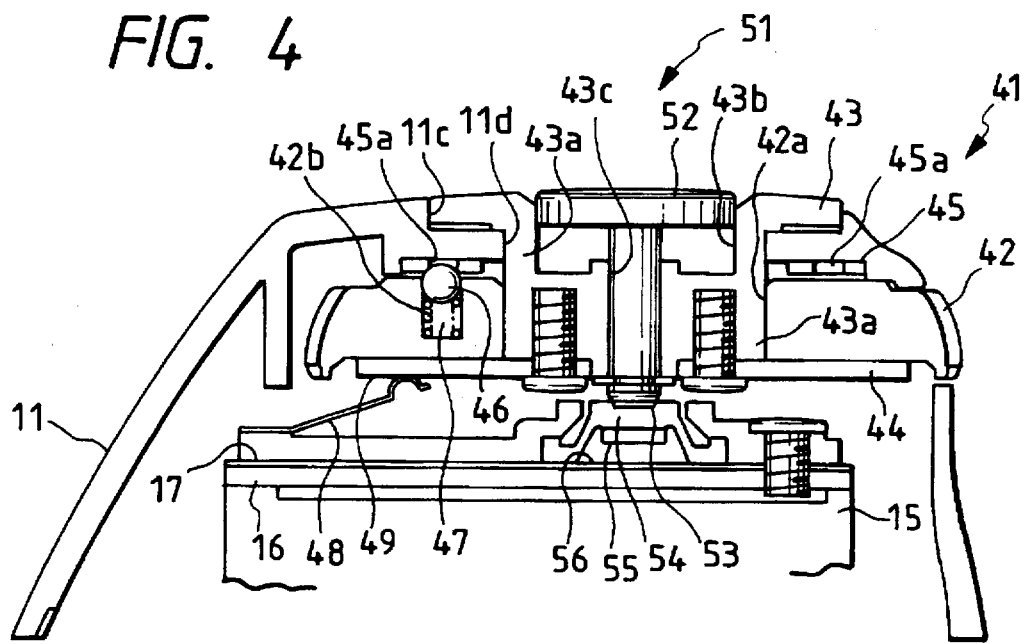
FIG. 4 is a partial section view taken along line IV—IV of FIG. 1.

FIG. 4 is a partial section view showing the structures of the mode change switch 41 and the mode setting switch 51 and taken along line IV—IV of FIG. 1.

The mode change switch 41 includes the mode setting dial 42 which functions as the operating unit and which is rotatably supported by the upper decorative cover 11, and the setting button 52 which is rotatably supported in coaxial with the mode setting dial 42 so as to be able to protrude or retract. In the upper surface of the upper decorative cover 11, formed are a recess 11c in which the indication ring 43 is housed, and a shaft hole 11d which rotatably supports a tubular shaft 43a of the indication ring 43. The shaft 43a passes through the recess 11c and the shaft hole 11d to be inserted into a shaft hole 42a of the mode setting dial 42 so as to be integrated therewith. A disk-like coded plate 49 is fixed by screws to an end surface of the shaft 43a so as to be closely contacted to an end surface of the mode setting dial 42.

A disk-like click stop plate 45 is fixed to the inner surface of the upper decorative cover 11 which is opposed to the upper end surface of the mode setting dial 42. A ball hole 42b for accommodating a click stop ball 46 is formed on the upper surface of the mode setting dial 42 which is opposed to the click stop plate 45. A stop ball 46 urged by a spring 47 is inserted into the ball hole 42b. The stop ball 46 is urged by the spring 47 toward the click stop plate 45 to be rotatably contacted to the plate. When the stop ball 46 is fitted into one of stop holes 45a which are formed in the click stop plate 45 at given intervals in a circumferential direction, the mode setting dial 42 is stopped at the position in a clicked manner. In this embodiment, seven stop holes 45a are formed.

A brush-like elastic contact 48 mounted on the base plate 16 is slidably contacted to the coded plate 49. Although not shown, a plurality of contact patterns are formed on the surface of the coded plate 49, and the elastic contact 48 has a plurality of contact pieces. The elastic contact 48 is contacted to the contact pattern corresponding to a click stop position at which the mode setting dial 42 is stopped, and makes an electrical connection.

A recess 43b is formed on the upper end surface of the indication ring 43, and a shaft hole 43c is formed in the bottom surface of the recess 43b. The setting button 52 of the setting switch 51 is mounted in the recess 43b and the shaft hole 43c by passing a shaft 53 of the setting button 52 through the shaft hole 43c. A locking member such as an E ring is fitted onto the tip portion of the shaft 53 which protrudes from the shaft hole 43c, so that the setting button 52 is prevented from slipping off from the shaft hole 43c.

A set switch member 54 having an elastic leg portion which has a truncated cone-like shape is disposed on the base plate 16 which is opposed to the tip portion of the shaft 53. The set switch member 54 includes a conductive contact 55 which is disposed on the lower surface of the truncated cone portion, and a pattern contact 56 which has two or more contacts and disposed at a position opposed to the conductive contact 55. The setting button 52, the set switch member 54, and the contacts 55 and 56 constitute the setting switch 51. When the setting button 52 is pressed down, the contact 55 is pressed down by the shaft 53 against the resilient force of the leg portion, with the result that the two contacts of the pattern contact 56 are electrically connected to each other via the conductive contact 55, or the set switch is turned on. In FIG. 1, reference character 43m designates an indicator indicating the mode/function which is currently set by the mode setting dial 42. In other words, a switch corresponding to the mode/function of the indication ring 43 which is indicated by the indicator 43m is turned on.

Figure 5:
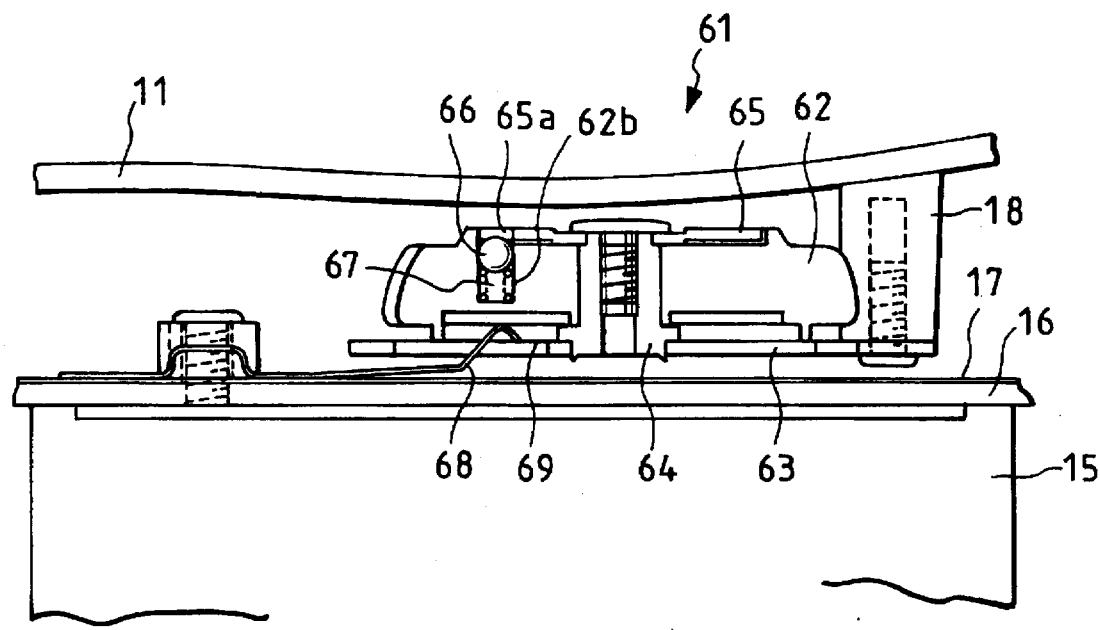
FIG. 5 is a partial section view taken along line V—V of FIG. 1.

FIG. 5 is a section view showing the structure of the AV electronic dial switch 61 and taken along line V—V of FIG. 1.

The AV operating dial 62 is rotatably supported via a shaft 64 by a supporting plate 63 fixed to a column 18 which is integrated with the inner surface of the upper decorative cover 11. The shaft 64 is fixed to the supporting plate 63 so as not to be rotated. A disk-like click stop plate 65 is fixed to the end surface of the shaft 64 which protrudes from the upper end of the AV operating dial 62.

A ball hole 62b for accommodating a click stop ball 66 is formed on the upper surface of the AV operating dial 62 which is opposed to the click stop plate 65. A stop ball 66 urged by a spring 67 is inserted into the ball hole 62b. The stop ball 66 is urged by the spring 67 toward the click stop plate 65 so as to be rotatably contacted to the plate. When the stop ball 66 is fitted into one of stop holes 65a which are formed in the click stop plate 65, the AV operating dial 62 is stopped at the position in a clicked manner. Seven stop holes 65a are formed at given intervals in a circumferential direction so that the AV operating dial 62 is stopped at either of the plural rotation positions in a clicked manner.

A disk-like coded plate 69 is fixed to the lower surface of the AV operating dial 62. A brush-like elastic contact 68 mounted on the base plate 16 is slidably contacted to the coded plate 69. Although not shown, a periodical conductive/non-conductive pattern is formed on the surface of the coded plate 64 along the circumferential portion to which the elastic contact 68 is slidingly contacted. The conductive/non-conductive pattern is formed in such a manner that one non-contact state between the pattern and the elastic contact 68 is established during the process in which the AV operating dial 62 is moved from one click stop position to an adjacent click stop position, or one turn-on or off operation is done.

Figure 6:
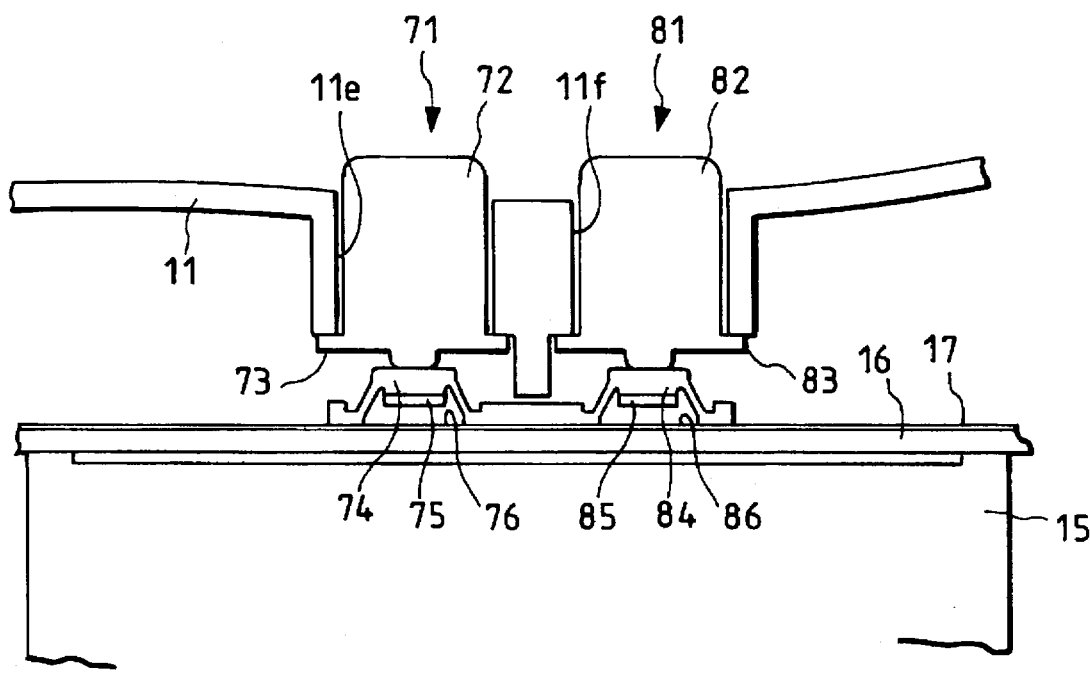
FIG. 6 is a partial section view taken along line VI—VI of FIG. 1.

FIG. 6 is a section view showing the structures of the memory switch 71 and the clear switch 81 and taken along line VI—VI of FIG. 1.

The memory button 72 which functions as the operating unit of the memory switch 71, and the clear button 82 which functions as the operating unit of the clear switch 81 are respectively inserted into button holes 11e and 11f which are juxtaposed in the upper decorative cover 11, from the inside of the camera body 10. Locking flanges 73 and 83 which are greater in diameter than the button holes 11e and 11f are formed at the inner ends (or the ends inside the camera body) of the button holes 11e and 11f so as to be integrated therewith, respectively.

Contact members 74 and 84 having an elastic leg portion which has a truncated cone-like shape are disposed on the flexible printed circuit board 17 which is opposed to the inner end surfaces of the memory button 72 and the clear button 82. The contact members 74 and 84 include conductive contacts 75 and 85 which are disposed on the lower surface of the truncated cone portion, and pattern contacts 76 and 86 which have two or more contacts and disposed at positions opposed to the conductive contacts 75 and 85, respectively. The pattern contacts 76 and 86 are connected to corresponding switch input terminals of the switch input unit 163 which will be described later. The memory button 72, the contact member 74, the contact 75, and the pattern contact 76 constitute the memory switch 71. Similarly, the clear button 82, the contact member 84, the contact 85, and the pattern contact 86 constitute the clear switch 81.

When the memory button 72 is pressed down, the conductive contact 75 is pressed down by the memory button 72 against the resilient force of the leg portion to be contacted to the pattern contact 76, with the result that the pattern contact 76 becomes conductive or the memory switch 71 is turned on. When the clear button 82 is pressed down, similarly, the conductive contact 85 is pressed down by the clear button 82 against the resilient force of the leg portion to be contacted to the pattern contact 86, with the result that the pattern contact 86 becomes conductive or the clear switch 81 is turned on.

The TV operating dial 92 has the same configuration as the AV operating dial 62. The shutter release button 93 is configured in the same manner as known shutter release buttons. Also, the IF button 94, the ML button 95, the photometric mode selecting button 96 and the exposure correcting button 97 are configured in the same manner as the memory button 72, the clear button 82, and known push buttons.

Figure 9:
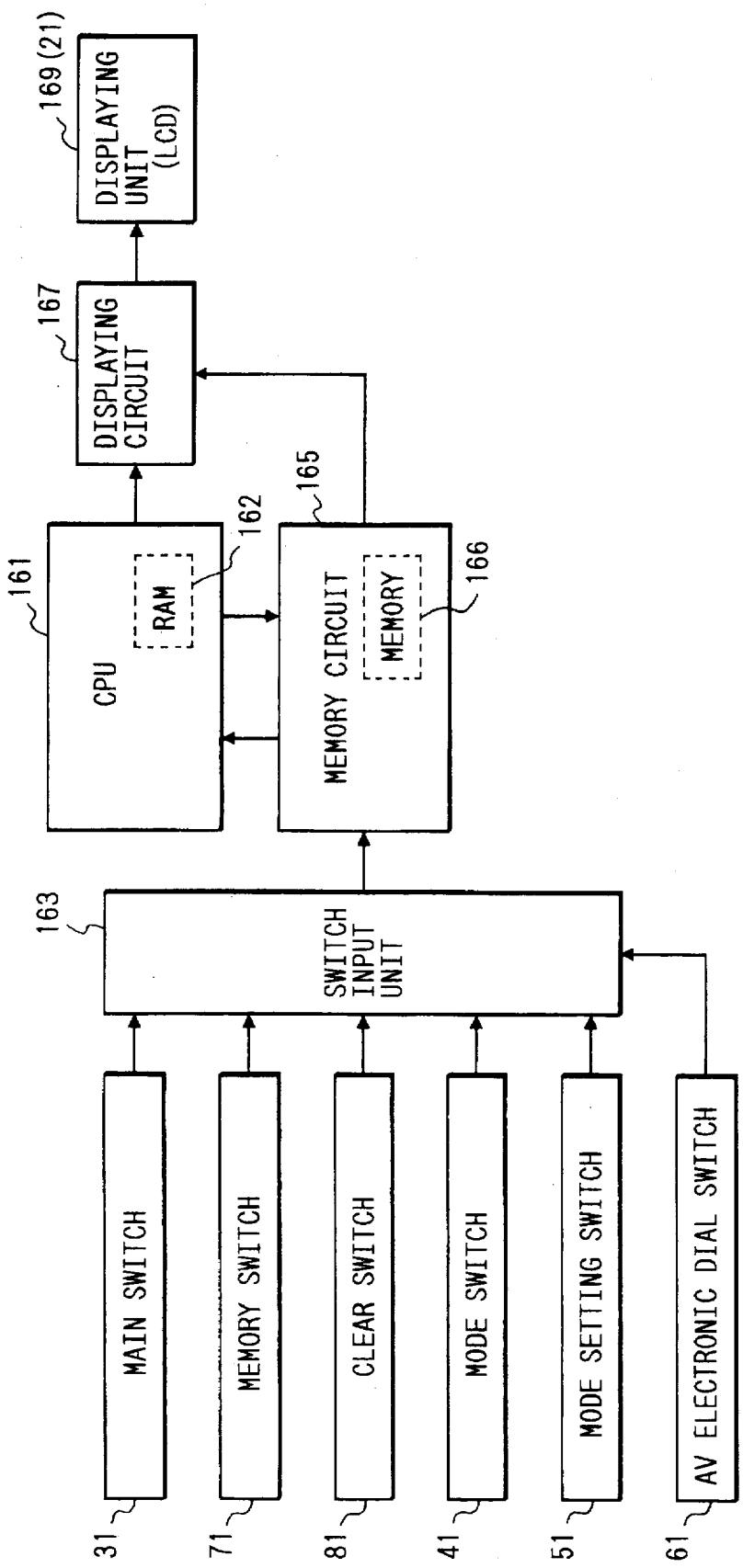
FIG. 9 is a block diagram showing an example of the circuit configuration of the camera.

The mechanical configuration of the camera body 10 of the single-lens reflex camera of the first embodiment of the invention has been described. The configuration of a control circuit of the camera will be described with reference to a block diagram of FIG. 9 showing the main portion.

The switches 31 (SW1 and SW2), 41, 51, 61, 71 and 81 are connected to the switch input unit 163. The switch input unit 163 can detect the ON/OFF states of the switches 31, 41, 51, 61, 71 and 81. Although not shown, also other switches and the like are connected to the switch input unit 163.

The switch information detected by the switch input unit 163 is input to a CPU 161 which functions as the control means for collectively controlling various faculties of the camera. The CPU 161 executes processing in accordance with programs previously stored in a ROM (not shown), based on the input switch information. The switch information detected by the switch input unit 163 is supplied also to a memory circuit 165 which functions as the memory means. The ROM stores various faculties, changeable modes/functions of the camera, initial data of the changeable modes/functions, etc.

The CPU 161 incorporates a RAM 162 which functions as the mode memory means for storing data of a mode/function to be used in photography. The CPU 161 calls the mode/function stored in the RAM 162, controls a displaying circuit 167 so as to display the called data on a displaying unit 169, and uses the data in photography. The displaying unit 169 includes the LCD panel 21, and an indicator in the finder which is not shown.

The memory circuit 169 includes a memory 166 which functions as the memory means for storing the mode/function written into the RAM 162. The mode/function stored in the memory 166 is called the memory mode. As the memory 166, useful is a dynamic RAM, a static RAM, an EEPROM which is rewritable, or the like. In this embodiment, the RAM 162 and the memory 166 are realized by separate memory means. Alternatively, these memories may be realized by different memory areas or addresses of the same memory means.

When the set switch SW1 is turned on, the CPU 161 calls the mode/function (memory mode) stored in the memory 166, displays it on the LCD panel 21, and uses it in photography. In contrast, when the power switch SW2 is turned on, the CPU 161 calls the mode/function stored in the RAM 162, displays it on the LCD panel 21, and uses it in photography.

The process of changing or selecting the changeable modes/functions is executed by the CPU 161 in response to an operation conducted on the mode change switch 41, the setting switch 51, the AV electronic dial switch 61, or the TV operating dial 92. The single-lens reflex camera of the embodiment is configured so that the mode/function to be changed is selected by operating the mode change switch 41, the selection of the mode/function is enabled by turning on the setting switch 51, and mode/function options of the modes/functions are selected or changed by rotating the AV operating dial 62 or the TV operating dial 92 under the selection enabled state. The configuration is described in detail in, for example, Japanese Patent Unexamined Publication No. Hei. 5-27298.

The modes/functions include, for example, a photographing mode, a drive mode, an electronic sound mode, a film rewinding mode, an ISO value designating mode, a flash mode, a photometric mode, and a custom function.

Each mode/function includes mode/function options which can be selected or changed. The photographing mode includes as options a program exposure mode, an aperture-priority exposure mode, a shutter-priority exposure mode, a manual exposure mode, etc. The drive mode includes as options a single-frame mode, a continuous photographing mode, a self-timer mode, etc. The electronic sound mode includes as options a setting in which an alarm is raised by means of electronic sound when focus is attained or failed. The ISO value designating mode is an option mode where selection is done to determine whether a DX code written on a film cartridge is read and the ISO value is automatically set or the ISO value is manually set irrespective of the DX code. The film rewinding mode is an option mode where selection is done to determine whether, when the whole of a film has been used in photography, the film rewinding operation is to be automatically started or not. The flash mode includes as an option a switching of first blind synchronization/second blind synchronization, and the photometric mode includes as options a spot photometric mode and a separate photometric mode. The custom function is a function which can be set in accordance with preferences of the photographer.

For each of the above-mentioned drive mode, electronic sound mode, film rewinding mode, ISO value designating mode, flash mode, photometric mode, and custom function, one mode/function option is set as an initial mode, and the initial modes are written into the ROM of the CPU 161. When no mode is set or changed by the photographer, the initial modes are read out and then written into the RAM 162. Thereafter, the initial modes are displayed and used in photography.

In this embodiment, when the setting button 52 is pressed turned on, the mode/function selected by operating the mode setting dial 42 is set to the change enabled state, and the corresponding indication on the LCD panel 21 begins to blink. When the AV operating dial 62 is rotated under this state, modes which are selectable among modes in the change enabled state are sequentially changed and displayed on the LCD panel 21. When the setting button 52 is then turned off, the mode displayed on the LCD panel 21 is selected, and stored in the internal RAM 162 of the CPU 161. The mode stored in the RAM 162 is displayed on the LCD panel 21 and then used in actual photography.

In the single-lens reflex camera of this embodiment, when the memory switch 71 is turned on while the power switch SW2 is turned on, the mode stored in the RAM 162 is written into the memory circuit 165 (the memory 166). When the set switch SW1 interlocked with the main switch operating unit 32 is turned on and the power switch SW2 is turned off, the mode/function (memory mode) stored in the memory circuit 165 is called, displayed on the LCD panel 21, and then used in photography. In other words, when the set switch SW1 is turned on, photography is conducted in the mode stored in the memory circuit 165, and, when the power switch SW2 is turned on, photography is conducted in the mode stored in the RAM 162 of the CPU 161.

When the clear switch 81 is turned on while the set switch SW1 is turned on, the memory circuit 165 erases (clears) the mode/function data (memory mode) stored in the memory 166, under the control of the CPU 161. When the contents of the memory 166 are cleared as described above, the CPU 161 calls from the ROM the initial mode/function with respect to each of the changeable modes/functions, and stores them in the memory circuit 165. In accordance with the initial modes/functions, the display and photography processes are then executed.

Figure 10:
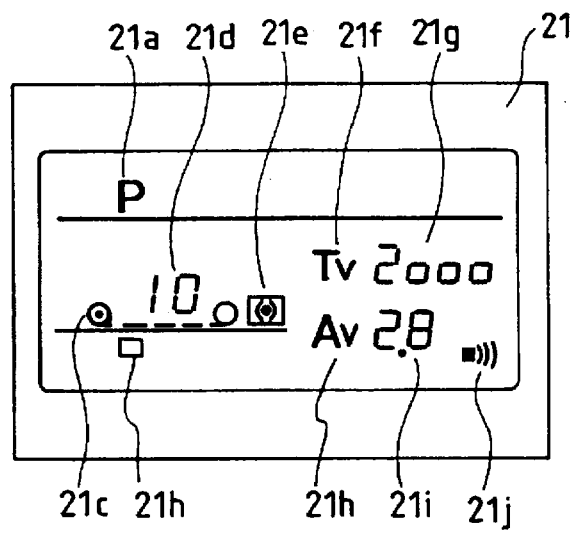
FIG. 10 is a view showing a display manner of the camera.
Figure 11:
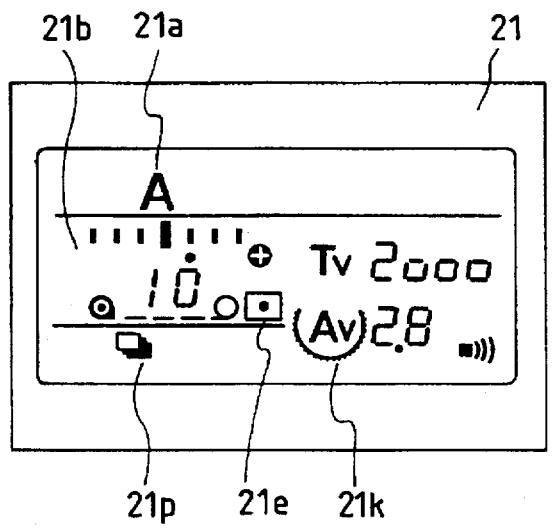
FIG. 11 is a view showing another display manner of the camera.
Figure 12:
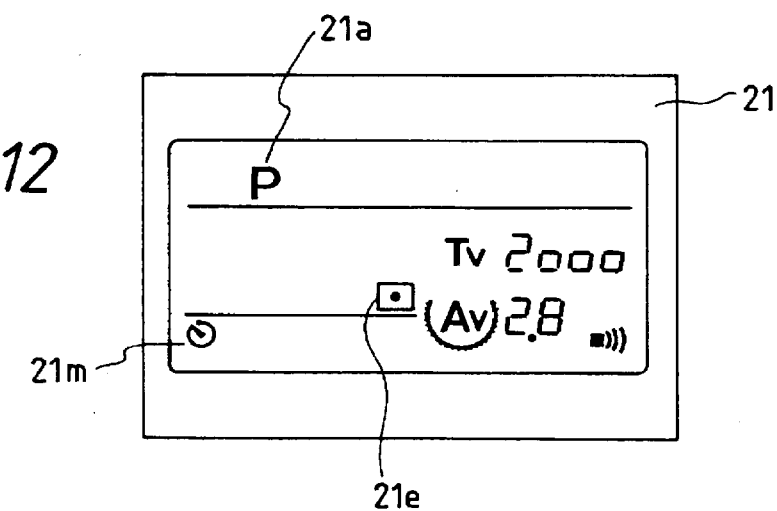
FIG. 12 is a view showing still another display manner of the camera.
Figure 13:
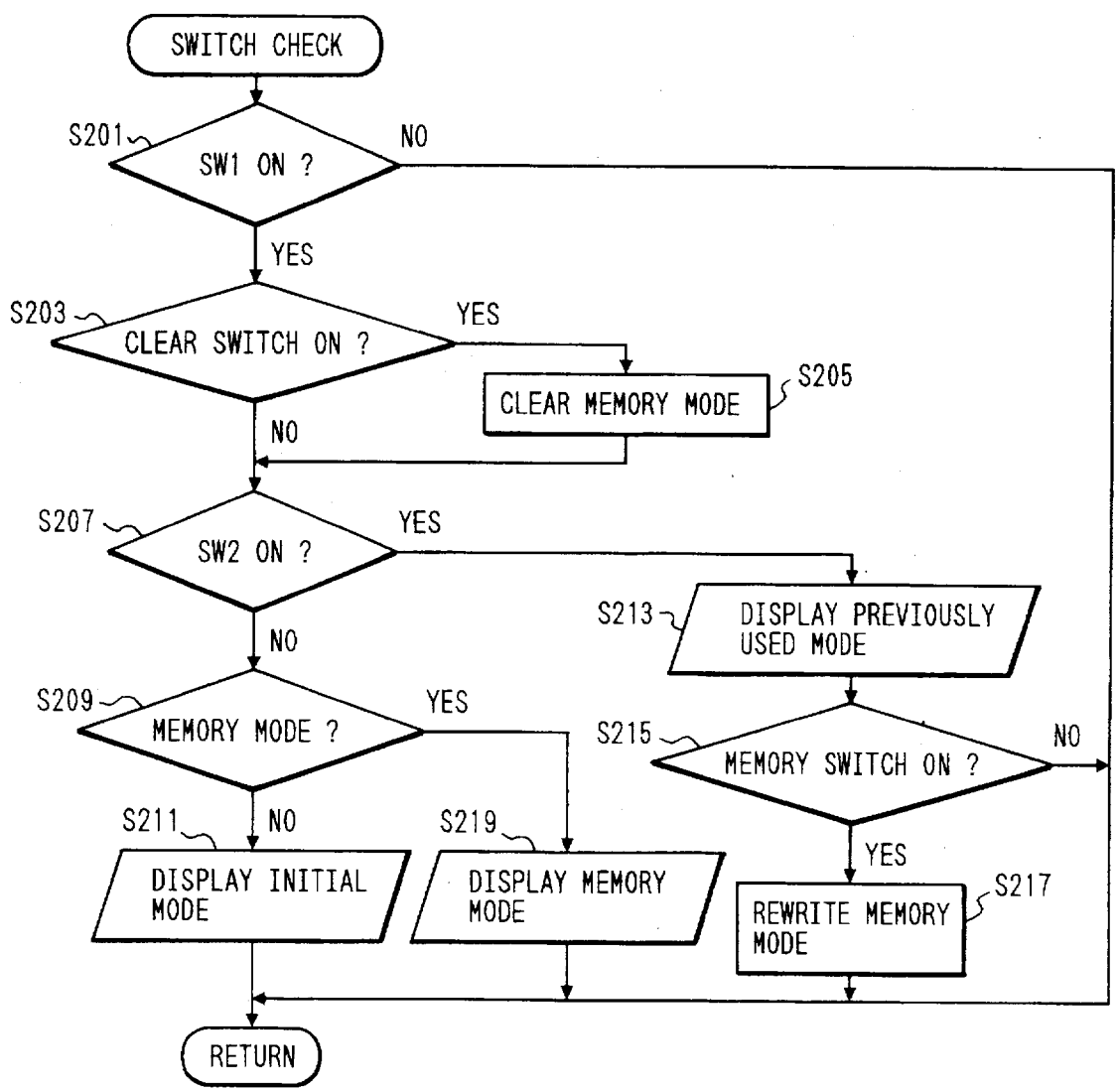
FIG. 13 is a flowchart of a storage process of the camera.

The features of the invention will be further described with reference to display manners shown in FIGS. 10 to 12 and a flowchart shown in FIG. 13. The invention is characterized in that photographic faculties which can be selected, changed or set by the photographer, such as the exposure mode, the drive mode, the photometric mode, and the AF mode can be collectively called, and the faculties can be displayed, changed, or collectively changed to another mode.

The LCD panel 21 includes many display elements, and performs the following indications by using the display elements. FIG. 10 shows initial values stored in the internal ROM of the CPU 161, or the initial mode in the case where no selection, change or setting is conducted by the photographer. FIG. 11 shows a state where the mode change or setting is done by the photographer. FIG. 12 shows a case where the main switch 31 (the power switch SW2) is turned on. In the figures, reference character 21a designates the exposure mode. In FIGS. 10 and 12, the exposure mode is indicated as the program exposure mode, and, in FIG. 11, as the automatic exposure mode. Indications designated by reference characters 21a and 21g indicate the aperture-priority exposure mode. A ¾ circle designated by reference characters 21k indicates that the aperture can manually be set by operating the AV operating dial 62.

Reference character 21b indicates the exposure correction. In FIG. 11, the exposure is corrected by +0.5 EV.

Reference character 21c indicates that film is loaded, and 21d, the current number of photograph frames. In FIGS. 10 and 11, it is indicated that the 10th frame is to be photographed.

Reference character 21e indicates the photometric mode. In FIG. 10, the separate photometric mode is indicated, and, in FIGS. 11 and 12, the spot photometric mode is indicated.

Reference character 21f indicates a shutter speed icon, and 21g, the value of the shutter speed. Reference character 21h indicates an aperture icon, and 21i, the value of the aperture.

Reference characters 21m, 21n and 21p indicate the drive mode. Specifically, reference character 21m indicates the self-timer mode, 21n, the single-frame mode, and 21p, the continuous photographing mode. Reference character 21j indicates that the electronic sound is being turned on.

The set state call process which is a feature of the invention will be described with reference to the flowchart shown in FIG. 13. The flowchart shows one of subroutines which are executed by timer interruption of the CPU 161. In the subroutine, the set switch SW1, the power switch SW2, the clear switch 81 and the memory switch 71 are checked and processes are conducted in accordance with the ON states of the switches.

When the subroutine is started, the process of checking the set switch SW1 is executed first. If the set switch SW1 is turned off, the control exits from the subroutine without conducting any further process (S201). If the set switch SW1 is turned on, the following processes are executed.

If the clear switch 81 is turned on, the mode/function stored in the memory 166 is cleared (S205). As a result of this clear operation, the changeable mode/function which can be called in response to the ON operation of the set switch SW1 is returned to the initial mode.

If the power switch SW2 is turned on, the mode/function stored in the RAM 162 of the CPU 161, i.e., the last mode/function which has been subjected to a changing or setting process, is called and displayed on the LCD panel 21 through the displaying circuit 167 (S207 and S213). If the memory switch 71 is turned on, the mode/function stored in the RAM 162 is written into the memory 166 of the memory circuit 165, and the control returns (S215 and S217). If the memory switch 71 is not turned on, the writing process is not conducted on the memory 166, and the control returns (S215).

As a result of the rewriting process of step S217, the mode/function stored in the RAM 162 of the CPU 161 is written into the memory 166 of the memory circuit 165. When the control passes through step S219 at the next time, the mode/function written into the memory 166 is displayed.

In contrast, in the case where the memory mode exists while the power switch SW2 is turned off, when the memory 166 stores a mode/function, the mode/function read out from the memory circuit 165 is displayed (see FIG. 11), and the control returns (S207, S209 and S219). When the memory 166 stores no mode/function or when the memory 166 is cleared in step S205, the initial mode is displayed (see FIG. 10), and the control returns (S207, S209 and S211).

In the above processes, the mode/function stored in the memory 166 is not written into the RAM 162. Alternatively, the reverse writing process may be conducted. For example, a process in which, in the memory switch 71 is being turned on, the mode written into the memory 166 is written into the RAM 162 of the CPU 161 may be added after step S219. In the alternative, the photographic mode can easily be returned to the mode selected before the change.

The main switch 31 is not restricted to a slide switch, and may be a rotary switch. Also in the case of a rotary switch, in the same manner as described above, at least the set and ON positions are provided and the memory mode is called at the set position.

Figure 7:
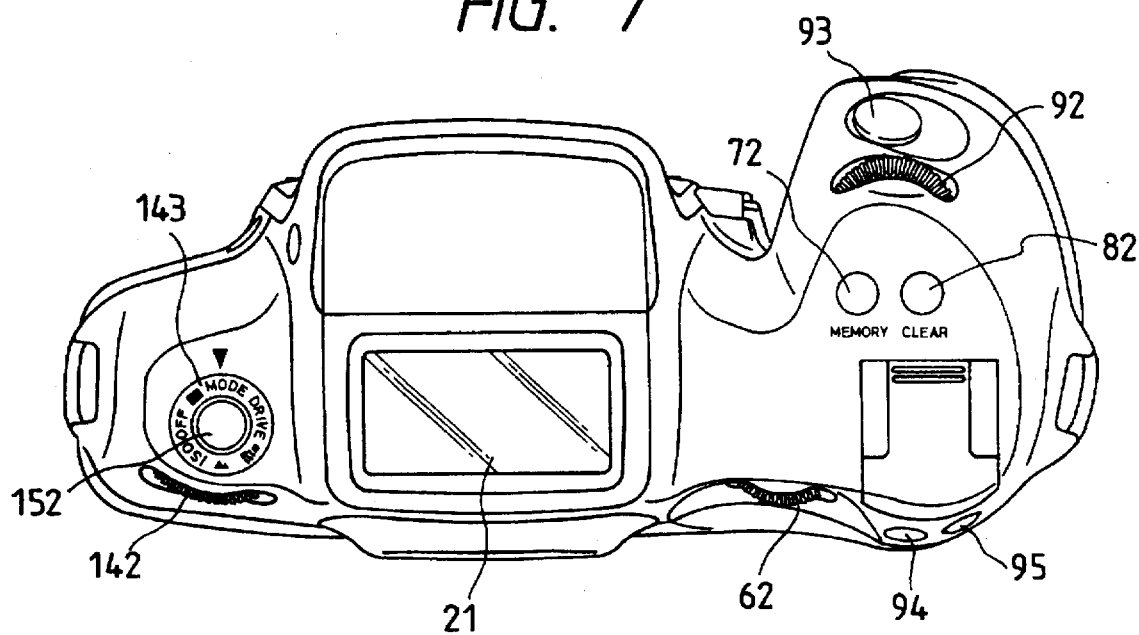
FIG. 7 is a plan view of another example of the camera body of a single-lens reflex camera to which the invention is applied, as seen from the photographer.

The main switch is not required to be separately disposed. The main switch may be realized by using an operation unit of a switch for another facility. An example of such a switch is shown in FIG. 7. In the example, an OFF position, a set position and an ON position are provided at click stop positions of a mode dial 142, respectively, so that the set switch SW1 is turned on at the set position and the power switch SW2 is turned on at the ON position. An indication ring 143 and a setting button 152 are configured so as to attain this facility. Also the memory switch and the clear switch are not required to be separately disposed. Each of the switches may be realized by, for example, simultaneously pressing two arbitrary switches.

As described above, according to the invention, the memory means for storing the changeable modes/functions and the mode memory means which changes the changeable modes/functions in response to a selection operation are separately disposed, and the means for calling the modes/functions stored in the memory means are separately disposed. Therefore, a mode/function which has been used before the change can quickly be selected. Furthermore, the operation of calling the mode/function stored in the memory means is initiated by operating the switch interlocked with the main switch, in place of an exclusive switch operation member. Therefore, an exclusive switch operation member is not required, the necessary space is reduced and the production cost is lowered.

Second Embodiment

Figure 14:
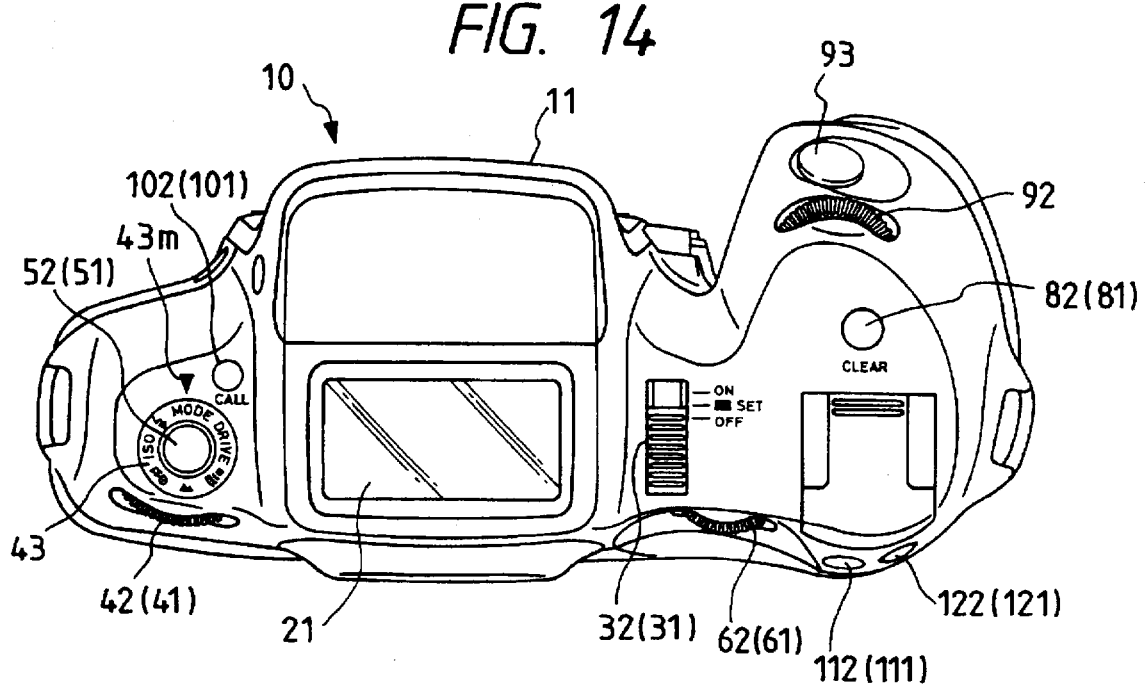
FIG. 14 is a plan view of the camera body of a single-lens reflex camera of a second embodiment of the invention, as seen from the photographer.

A second embodiment of the invention will be described. In the second embodiment, portions similar to those of the first embodiment are designated by the same reference characters, and their description is omitted. 5 FIG. 14 is a plan view of the camera body of a single-lens reflex camera of the second embodiment of the invention, as seen from the photographer, and FIG. 15 is a rear view of the camera body.

In the second embodiment, a call switch button 102 of a call switch 101 for calling a stored mode is disposed in front of the mode setting dial 42 and the indication ring 43. An IF button 112 of an IF switch 111, and an ML button 122 of an ML switch 121 for locking the exposure level are mounted in the side of the AV operating dial 62. In this embodiment, the memory switch 71 (the memory button 72) used in the first embodiment is omitted.

Figure 15:
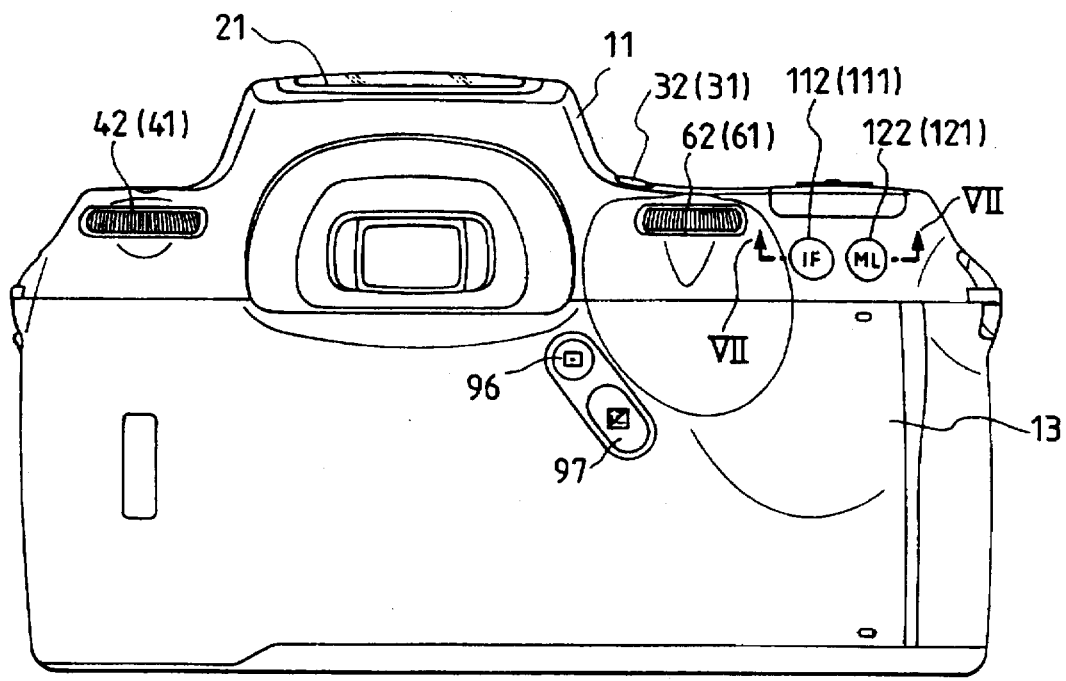
FIG. 15 is a rear view of the camera body.
Figure 16:
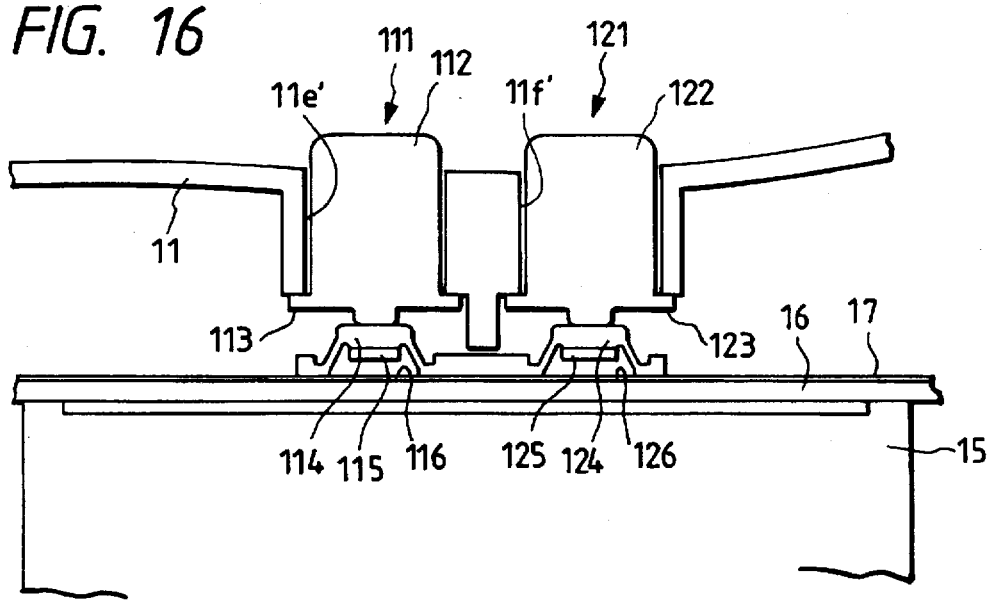
FIG. 16 is a partial section view taken along line VII—VII of FIG. 15.

FIG. 16 is a section view showing the structures of the IF switch 111 and the ML switch 121 and taken along line VII—VII of FIG. 15.

The IF button 112 which functions as the operating unit of the IF switch 111, and the ML button 122 which functions as the operating unit of the ML switch 121 are respectively inserted into button holes 11e' and 11f which are juxtaposed in the upper decorative cover 11, from the inside of the camera body 10. Locking flanges 113 and 123 greater in diameter than the button holes 11e' and 11f are formed at the inner ends so as to be integrated therewith, respectively.

Contact members 114 and 124 having an elastic leg portion which has a truncated cone-like shape are disposed on the flexible printed circuit board 17 which is opposed to the inner end surfaces of the IF button 112 and the ML button 122. The contact members 114 and 124 include conductive contacts 115 and 125 which are disposed on the lower surface of the truncated cone portion, and pattern contacts 116 and 126 which have two or more contacts and disposed at positions opposed to the conductive contacts 115 and 125, respectively. The pattern contacts 116 and 126 are connected to switch input terminals of the switch input unit 163 which will be described later. The IF button 112, the contact member 114, the contact 115, and the pattern contact 116 constitute the IF switch 111. Similarly, the ML button 122, the contact member 124, the contact 125, and the pattern contact 126 constitute the ML switch 121.

When the IF button 112 is pressed down, the conductive contact 115 is pressed down against the resilient force of the leg portion to be contacted to the pattern contact 116, with the result that the pattern contact 116 becomes conductive or the IF switch 111 is turned on. When the ML button 122 is pressed down, similarly, the conductive contact 125 is pressed down against the resilient force of the leg portion to be contacted to the pattern contact 126, with the result that the pattern contact 126 becomes conductive or the ML switch 121 is turned on.

The clear button 82 and the call button 102 are configured in the same manner As the IF button 112 and the ML button 122.

The mechanical configuration of the camera body 10 of the single-lens reflex camera of the second embodiment of the invention has been described. The configuration of a control circuit of the camera will be described with reference to a block diagram of FIG. 17 showing the main portion.

The main switch 31 (the set switch SW1 and the power switch SW2), the mode switch 41, the setting switch 51, the clear switch 81, the call switch 101 and the ML switch 121 are connected to the switch input unit 163. The switch input unit 163 can detect the ON/OFF states of the switches 31, 41, 51, 81, 101 and 121. Although not shown, other switches and the like are connected to the switch input unit 163. The other portions of the control circuit have the same configuration as the first embodiment described above.

In the single-lens reflex camera of this embodiment, when the set switch SW1 interlocked with the main switch operating unit 32 is turned on and the power switch SW2 is turned off, the mode/function stored in the memory circuit 165 is called, displayed on the LCD panel 21, and then used in photography. In other words, when the set switch SW1 is turned on, photography is conducted in the mode stored in the memory circuit 165, and, when the power switch SW2 is turned on, photography is conducted in the mode stored in the RAM 162 of the CPU 161.

Generally, modes having a lower use priority (use frequency) include the ISO value designating mode, the electronic sound mode, the film rewinding mode, etc., and modes having a higher use priority include the photographing mode, the drive mode, the flash mode, etc.

Figure 20:
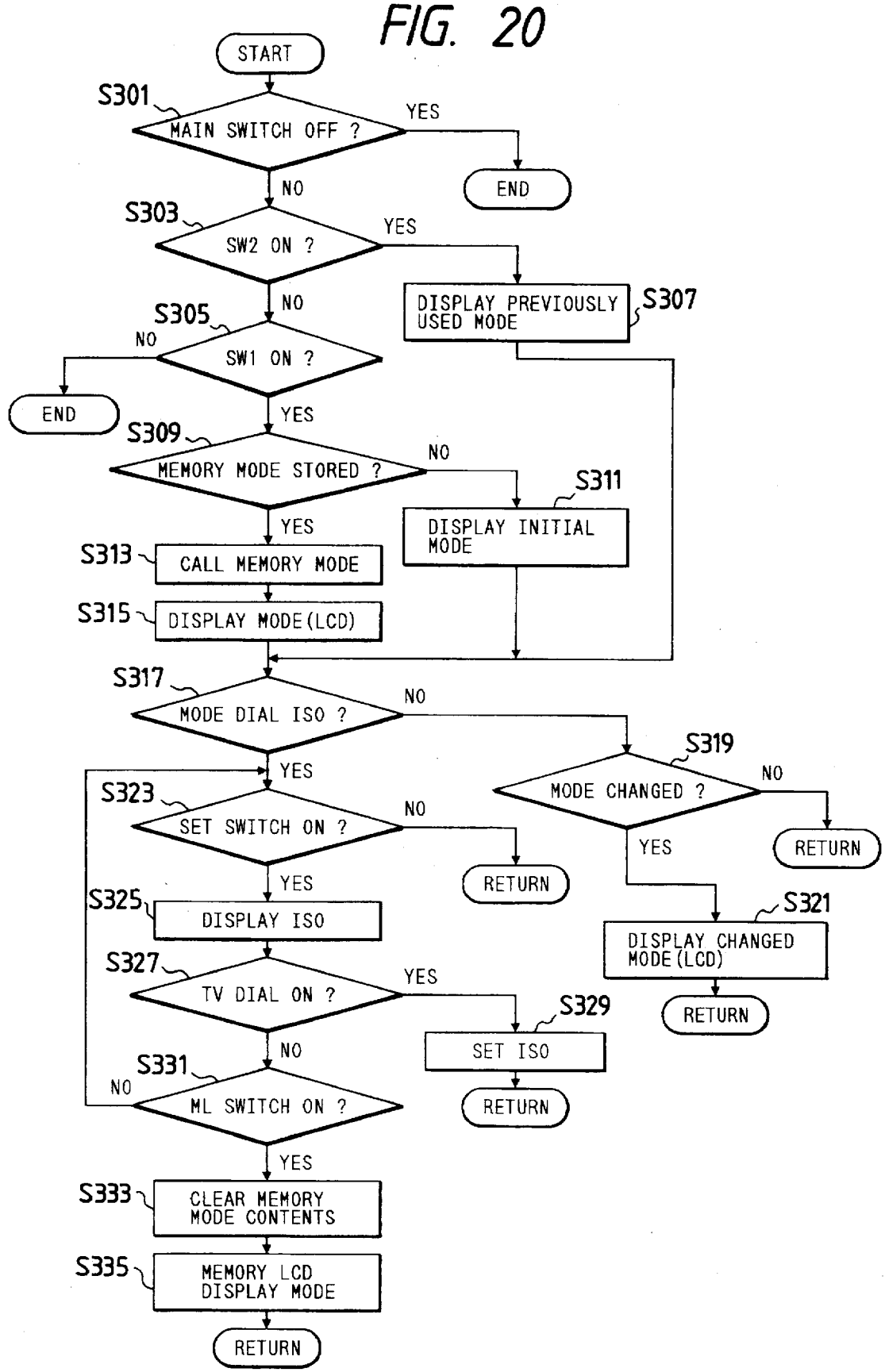
FIG. 20 is a flowchart of an example of a storage process of the camera.
Figure 21:
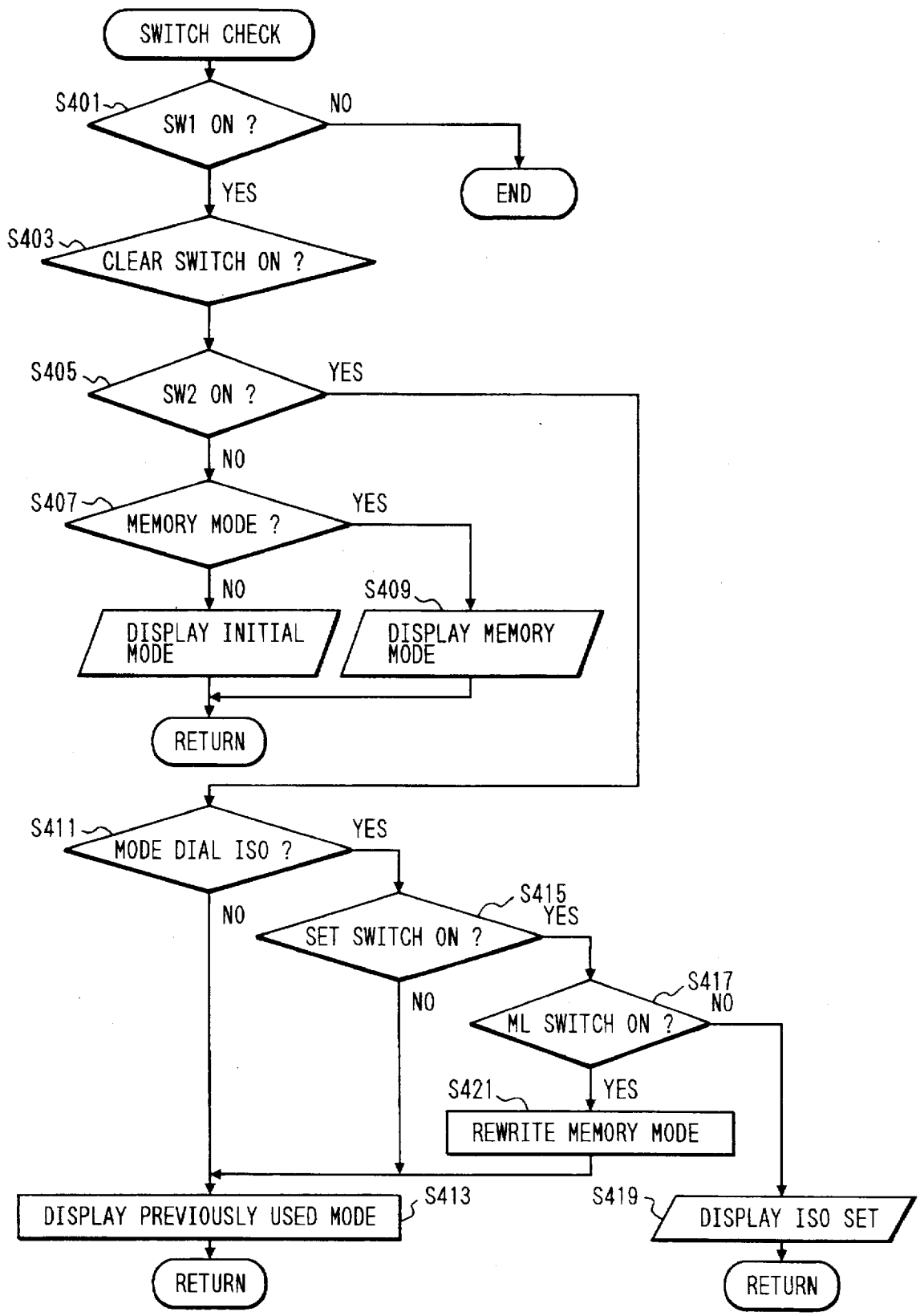
FIG. 21 is a flowchart of another example of a storage process of the camera.

The features of the invention will be further described with reference to display manners shown in FIGS. 18 and 19 and flowcharts shown in FIGS. 20 and 21.

Figure 18:
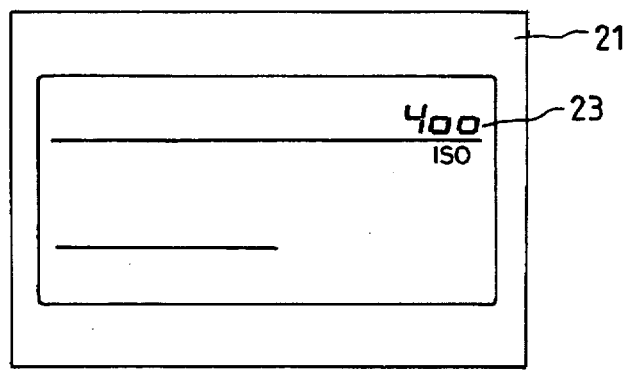
FIG. 18 is a view showing a display manner of the camera.
Figure 19:
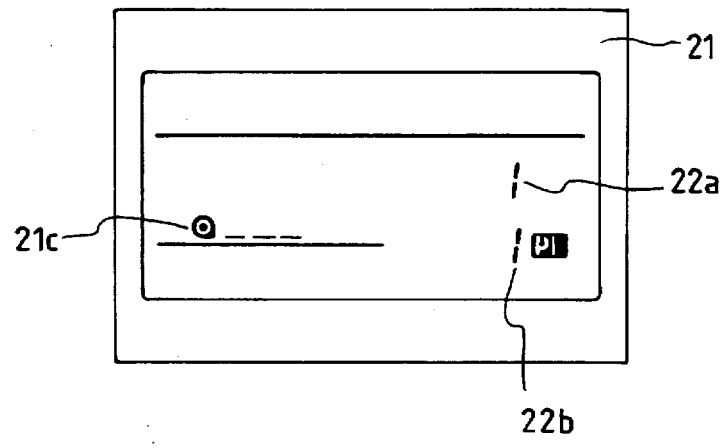
FIG. 19 is a view showing another display manner of the camera.

FIGS. 18 and 19 show the state in this embodiment where the ISO value is being set and the state where the custom function is being set, respectively. In FIG. 18, reference character 23 indicates that the set ISO value is 400. In FIG. 19, reference character 22a indicates that the custom function number is 1, and 22b indicates that the option number of the custom function is 1. In this embodiment, custom function number 1 is a function in which selection is done to determine whether the film leader is to be pulled into the cartridge after the film rewinding process or to be left outside the cartridge. In FIG. 19, it is indicated that option 1 in which the film leader is to be left outside the cartridge is selected.

The change/setting of the ISO value is conducted by pressing the setting button 52 under the state where the mode dial 42 is set to ISO or an "ISO" indication of the indication ring 43 is aligned with the indicator 43m, and rotating the TV operating dial 92 while pressing the button.

When the mode setting dial 42 is set as described above and then the setting button 52 is pressed, the setting switch 51 is turned on so that the display state of the LCD panel 21 is changed to that of displaying the ISO value shown in FIG. 18 to display the currently set ISO value. When the TV operating dial 92 is rotated under this state, the ISO value is increased or decreased in accordance with the rotation direction, and the changed value is displayed. When the setting button 52 is then turned off, the ISO value displayed on the LCD panel 21 is set, and written into the RAM 162.

The change/setting of the custom function is conducted by pressing the setting button 52 under the state where the mode dial 42 is set to PF or a "PF" indication of the indication ring 43 is aligned with the indicator 43m, and rotating the TV operating dial 92 and the AV operating dial 62 while pressing the button.

When the mode setting dial 42 is set as described above and then the setting button 52 is pressed, the setting switch 51 is turned on so that the display state of the LCD panel 21 is changed to that of displaying the custom function change shown in FIG. 19 where the initial number of function number, i.e., 1, and the currently selected option number are displayed. When the TV operating dial 92 is rotated under this display state, the function number is increased or decreased in accordance with the rotation direction, and the selected option number of the function number is displayed. When the AV operating dial 62 is rotated, the displayed option number is increased or decreased. When the setting button 52 is then turned off, the option numbers of the changed custom function numbers are written into the RAM 162, and set.

In the above, the processes of setting the ISO value and the custom function have been described. This embodiment is characterized in that the stored contents of the memory 166 are rewritten with the mode/function stored in the RAM 162 by pressing the ML button 122 during the process of setting the ISO value.

The mode/function setting process which is a feature of the invention will be described with reference to the flowcharts shown in FIGS. 20 and 21. FIGS. 20 and 21 show different examples realizing the invention. The examples are mainly different from each other in that the process of rewriting the memory 166 is executed when either of the set switch SW1 and the power switch SW2 is being turned on, or only when the power switch SW2 is being turned on. Each of the flowcharts shows one of subroutines which are executed by timer interruption of the CPU 161.

First, the first example shown in FIG. 20 will be described. When the control enters the process, the main switch 31 is checked to see whether it is turned off or not. If the switch is turned off or both the set switch SW1 and the power switch SW2 are turned off, the control exits from this flowchart without conducting any further process (S301, or S301, S303 and S305). When either of the set switch SW1 and the power switch SW2 is turned on, the following processes are executed.

If the power switch SW2 is turned on, the mode/function stored in the RAM 162 is displayed and the control jumps to S317 (S303 and S307). If the power switch SW2 is turned off and only the set switch SW1 is turned on, the processes of steps S309 to S315 described below are conducted (S301, S303 and S305). If a mode/function (hereinafter, referred to as "memory mode") is not stored in the memory 166, the initial mode/function is read out from the ROM and displayed (S309 and S311). If a memory mode is stored, the memory mode is called and displayed (S309, S313 and S315).

After the mode/function stored in the RAM 162 or the memory mode called from the memory 166 is displayed, the mode setting dial 42 is checked to see whether it is set to the ISO value or not. If not, it is judged whether another mode/function was changed before the control enters this flowchart or not. If no change was done, the control returns without conducting any further process (S317 and S319). If a change was done, the changed mode/function is displayed on the LCD panel 21 and the control returns (S319 and S321).

If the mode setting dial 42 is set to the ISO value, the following processes are executed. The setting switch 51 is checked to see whether it is turned on or not. If it is not turned on, the control returns.

If the setting switch 51 is turned on, the set ISO value is displayed on the LCD panel 21 (see FIG. 18) (S323 and S325). If the TV operating dial 92 is then turned, the ISO value is increased or decreased in accordance with the rotation direction, and the control returns (S329). If the TV operating dial 92 is not turned, the ML switch 121 is checked to see whether it is turned on or not. If turned off, the control returns to step S323 (S331).

If the ML switch 121 is turned on, the memory mode of the memory 166 is cleared, the mode/function stored in the RAM 162 is written into the memory 166, and the control returns.

Next, the second example will be described with reference to FIG. 21. The second example is characterized in that the memory mode is rewritten only when the power switch SW2 is turned on.

When the control enters the subroutine, the set switch SW1 is checked. If the set switch SW1 is not turned on, the control exits from this process. If the set switch SW1 is turned on, the following processes are executed (S401).

If only the set switch SW1 is turned on, the following are done. If a memory mode is stored in the memory 166, the memory mode is called and displayed on the LCD panel 21. If a memory mode is not stored, the initial mode is called from the ROM to be displayed on the LCD panel 21, and the control returns (S401 to S409).

If both the set switch SW1 and the power switch SW2 are turned on, the following processes are executed.

If the mode setting dial 42 is not set to the ISO value, the mode/function stored in the RAM 162 is displayed, and the control returns (S411 and S413). Even in the case where the mode setting dial 42 is set to the ISO value, if the setting switch 51 is turned off, the mode/function stored in the RAM 162 is displayed, and the control returns (S411, S415 and S413).

If the mode setting dial 42 is set to the ISO value and the setting switch 51 is turned on, the following are done. If the ML switch 121 is turned on, the mode/function stored in the RAM 162 is written into the memory 166, the mode/function stored in the RAM 162 is displayed, and the control returns (S411, S415, S417, S421 and S413).

In the case where the mode setting dial 42 is set to the ISO value and the setting switch 51 is turned on, if the ML switch 121 is not turned on, the ISO value is displayed on the LCD panel 21, and the control returns (S411, S415, S417 and S419).

As described above, this embodiment includes the RAM 162 which stores a mode/function changed in the photography process, and the memory 166 which stores a mode/function irrespective of the change. When the set switch SW1 interlocked with the main switch operating unit 32 is turned on, the mode/function stored in the memory 166 is called, displayed, and used in the photography process. When the power switch SW2 is turned on, the mode/function stored in the RAM 162 is called, displayed, and used in the photography process. The process of writing the mode/function stored in the RAM 162 into the memory 166 is executed by turning on the ML switch 121 in the ISO value changing state under the state where, in the first example, the set switch SW1 or the power switch SW2 is turned on, and, in the second example, the power switch SW2 is turned on. Therefore, the process of accidentally rewriting the memory 166 is prevented. When the memory is to be rewritten, furthermore, the rewriting process can easily be done.

In the above, the invention has been described by way of the illustrated embodiment. The invention is not restricted to this embodiment. From the viewpoint of preventing the camera from being erroneously operated, for example, it is preferable to rewrite the memory 166 during an operation of changing a mode, function or the like having a lower use priority, such as the custom function, the film rewinding mode, or the electronic sound mode. Alternatively, the rewriting process may be allowed to be conducted during an operation of changing a mode having a higher use priority, such as the exposure mode, or the drive mode. A mode having a higher use priority is excellent because the photographer is accustomed to changing such a mode.

The operation means for executing the rewriting process is not restricted to the ML button 122, and may be any switch button or the like which is not used in the operation of changing a mode/function.

As seen from the above description, the camera of the invention includes the memory means for, independently of photographic mode memory means for storing a mode/function which is changed directly by the photographer, storing the mode/function stored in the photographic mode memory means. The process of writing the mode/function stored in photographic mode memory means into the memory means is enabled by an operation conducted during a process of rewriting a mode/function. Therefore, the stored contents of the memory means are prevented from being accidentally rewritten, and, when the contents are to be rewritten, the contents can easily be rewritten.

Third Embodiment

A third embodiment of the invention will be described. The camera body of the single-lens reflex camera of the third embodiment, and switches mounted on the camera body are configured in the same manner as those of the first embodiment described above, and their illustration and description are omitted (see FIGS. 1 to 6 and 8). However, The IF button 112 (the IF switch 111) and the ML button 122 (the ML switch 121) which are mounted in the side of the AV operating dial 62 have the same configuration as those of the second embodiment (see FIG. 16).

Figure 22:
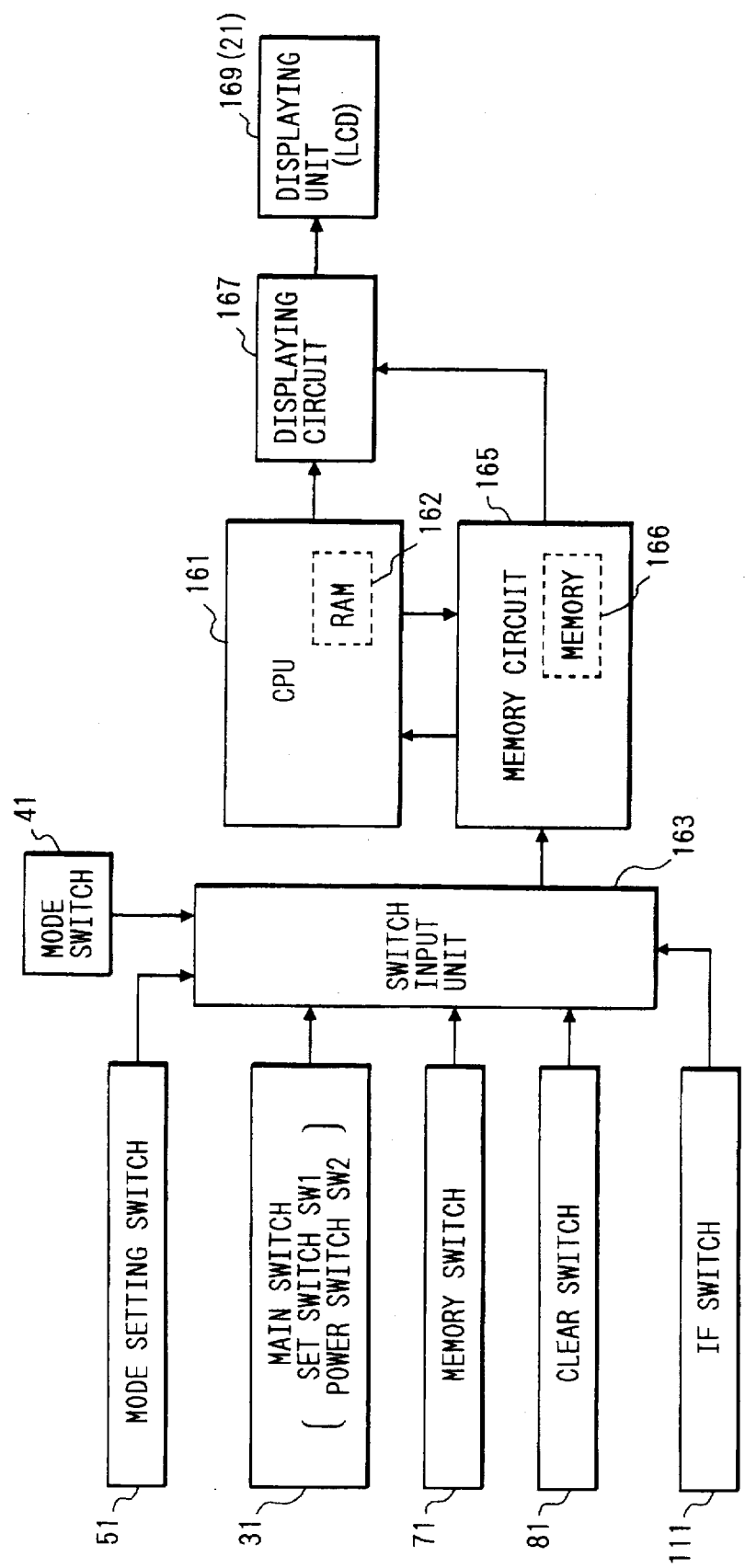
FIG. 22 is a block diagram showing an example of the circuit configuration of a single-lens reflex camera of a third embodiment of the invention.

First, the configuration of a control circuit of the single-lens reflex camera of the invention will be described with reference to a block diagram of FIG. 22 showing the main portion.

The main switch 31 (the set switch SW1 and the power switch SW2), the mode switch 41, the setting switch 51, the clear switch 81, and the IF switch 111 are connected to the switch input unit 163. The switch input unit 163 can detect the ON/OFF states of the switches 31, 41, 51, 81, and 111. Although not shown, also other switches and the like are connected to the switch input unit 163. The other portions of the control circuit have the same configuration as the first embodiment.

Modes/functions may be classified in an arbitrary manner. In this embodiment, as described later, the custom function can be rewritten at one time as one group to the initial values, in modes/functions which can be selected, changed and set by the photographer. The remaining modes/functions can be rewritten to the initial values together with the one group.

In this embodiment, when the setting button 52 is pressed (turned on) while the power switch SW2 is turned on, the mode/function selected by operating the mode setting dial 42 is set to the change enabled state, and the corresponding indication on the LCD panel 21 begins to blink. When the AV operating dial 62 is rotated under this state, modes which are selectable among modes in the change enabled state are sequentially changed and displayed on the LCD panel 21. When the setting button 52 is then turned off, the mode displayed on the LCD panel 21 is selected, and stored in the RAM 162 of the CPU 161. The mode/function stored in the RAM 162 is displayed on the LCD panel 21 and then used in actual photography.

In this embodiment, when the IF button 112 is turned on while custom function "PF" is selected by operating the mode setting dial 42, all the custom functions are initialized at one time, and the function data of the RAM 162 are rewritten into initial data.

When the memory switch 71 is turned on while the power switch SW2 is turned on, the mode stored in the RAM 162 is written into the memory circuit 165 (the memory 166). When the set switch SW1 interlocked with the main switch operating unit 32 is turned on and the power switch SW2 is turned off, the mode/function stored in the memory circuit 165 is called, displayed on the LCD panel 21, and then used in photography. In other words, when the set switch SW1 is turned on, photography is conducted in the mode stored in the memory circuit 165, and, when the power switch SW2 is turned on, photography is conducted in the mode stored in the RAM 162 of the CPU 161.

When the clear switch 81 is turned on while the set switch SW1 is turned on, the memory circuit 165 erases (clears) the mode/function data stored in the memory 166, under the control of the CPU 161. When the contents, of the memory circuit 165 are cleared as described above, the CPU 161 calls from the ROM the initial mode/function with respect to each of the changeable modes/functions, and stores them in the memory circuit 165. In accordance with the initial modes/functions, the display and photography processes are then executed.

Figure 24:
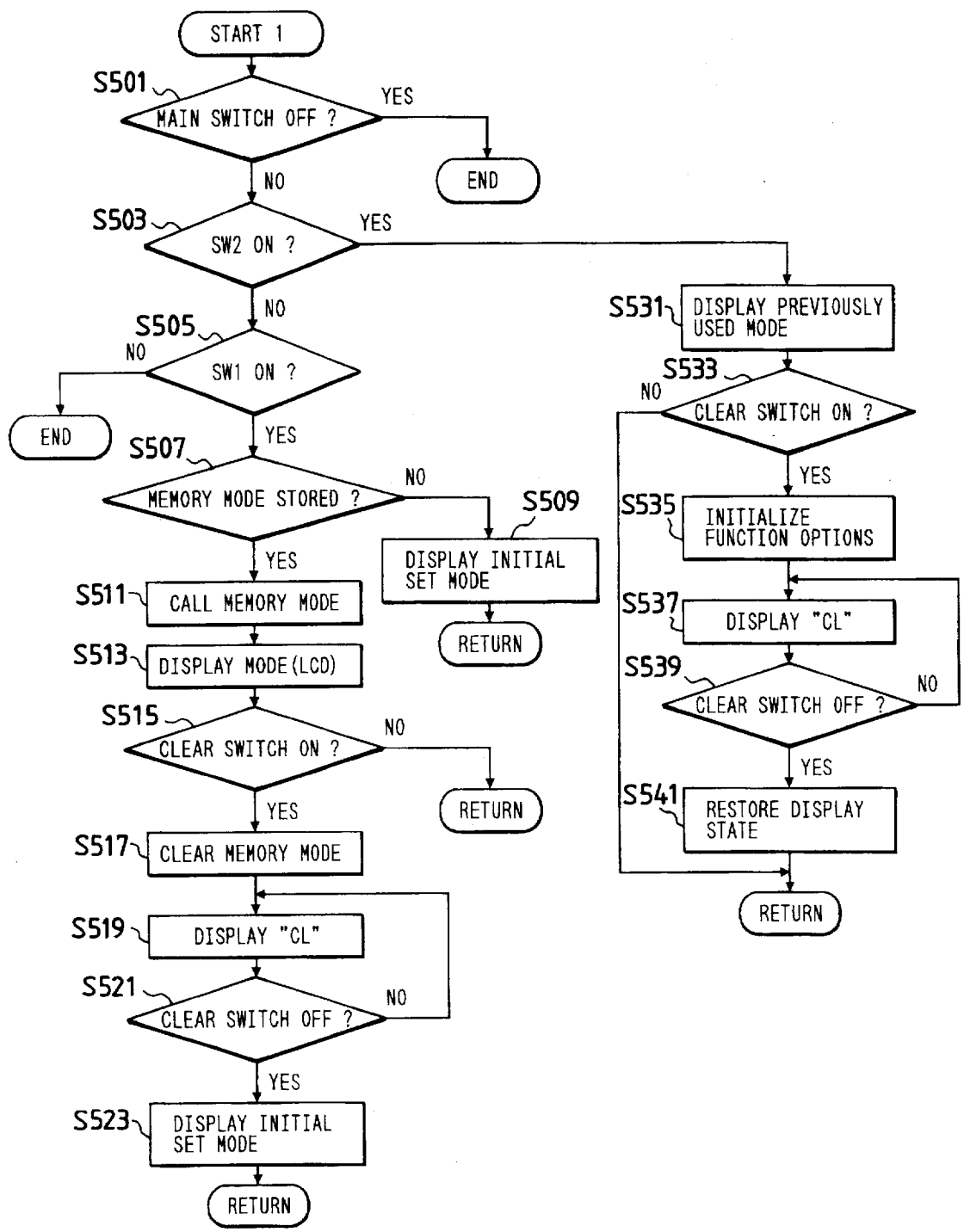
FIG. 24 is a flowchart of an example of a storage mode/function clear process of the camera.
Figure 25:
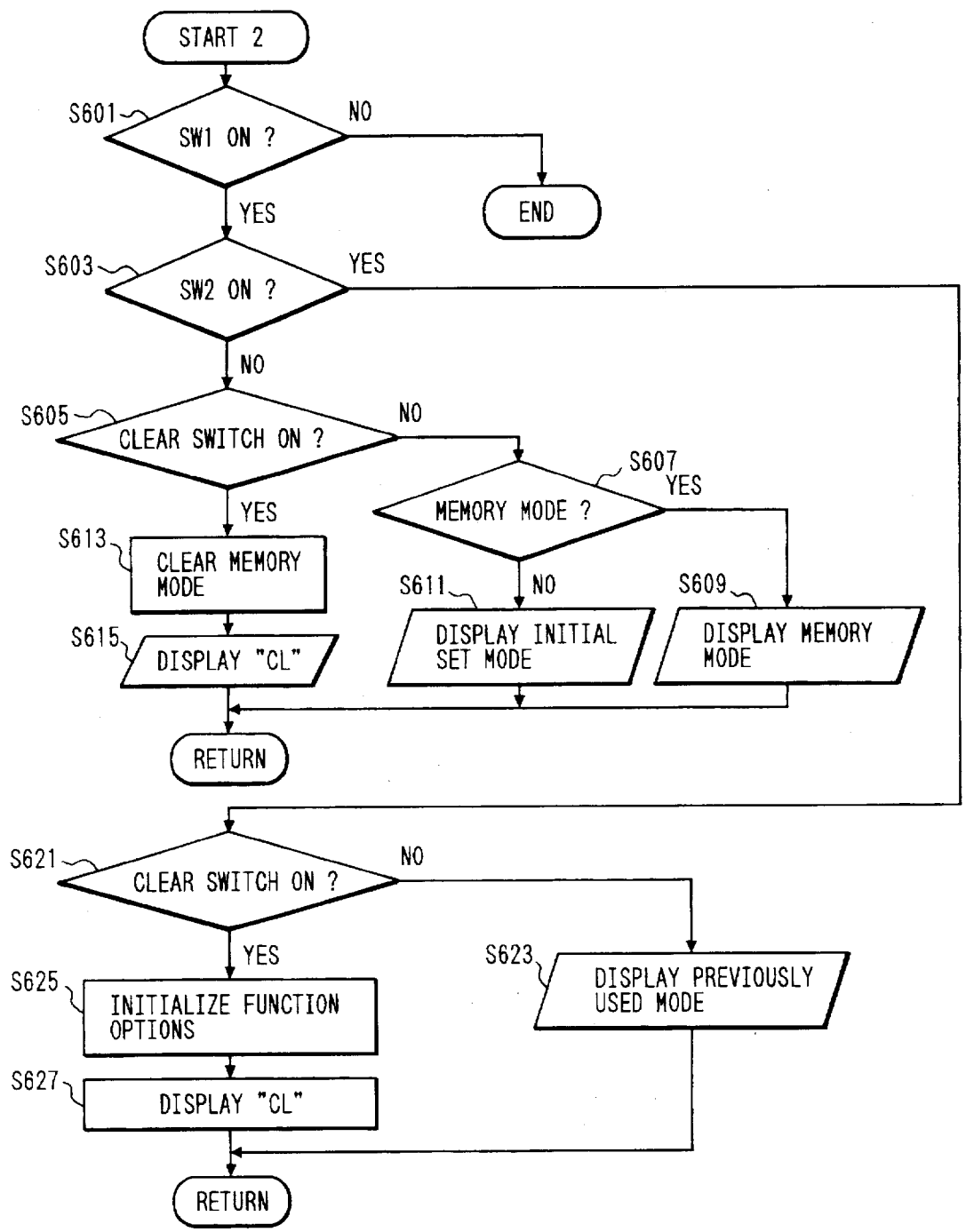
FIG. 25 is a flowchart of another example of a storage mode/function clear process of the camera.

The features of the invention will be further described with reference to display manners shown in FIGS. 19 and 23 flowcharts shown in FIGS. 24 and 25.

The invention is characterized in that photographic faculties which can be selected, changed or set by the photographer, such as the exposure mode, the drive mode, the photometric mode, and the flash mode can be collectively called, and the faculties can be indicated, changed, or collectively changed to another mode.

Figure 23:
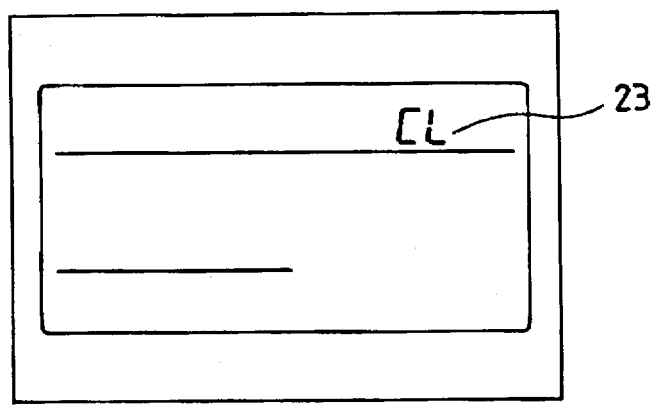
FIG. 23 is a view showing a display manner of the camera in the case of function clear.

FIGS. 19 and 23 show the state in this embodiment where the custom function is being set, and the state where the custom function is cleared, respectively. In FIG. 19, reference character 22b indicates that the option number of the custom-function is 1, and 22a indicates that the custom function number is 1. In this embodiment, custom function number 1 is a function in which selection is done to determine whether the film leader is to be pulled into the cartridge after the film rewinding process or to be left outside the cartridge. In FIG. 19, it is indicated that option 1 in which the film leader is to be left outside the cartridge is selected.

This embodiment has the following custom functions and options. Of course, the invention is not restricted to them.

In the following list, [1] to [4] indicate function numbers, 0 to 2 indicate option numbers, and 0 indicates an initial value.

---

[1] State when the film is rewound
   0   Pulled into the cartridge
   1   Left outside the cartridge
[2] State when the film is completely wound
   0   Automatically rewound
   1   Manually start rewinding
[3] Selection of exposure correction step
   0   0.5 EV step
   1   0.3 EV step
[4] Selection of program line
   0   Normal line
   1   Fast shutter priority line

---

The change/setting of the custom function is conducted by turning on the power switch SW2, pressing the setting button 52 under the state where the mode dial 42 is set to the function selection or the "PF" indication of the indication ring 43 is aligned with the indicator 43m, and rotating the TV operating dial 92 and the AV operating dial 62 while pressing the button.

When the mode setting dial 42 is set to the function selection as described above and then the setting button 52 is pressed, the setting switch 51 is turned on so that the display state of the LCD panel 21 is changed to that of displaying the custom function change shown in FIG. 19 where function number 1 and the currently selected option number are displayed. When the TV operating dial 92 is rotated under this display state, the function number is increased or decreased in accordance with the rotation direction, and the selected option number of the function number is displayed. When the AV operating dial 62 is rotated, the displayed option number is increased or decreased. When the setting button 52 is then released, data of the option numbers of the changed custom function numbers are written into the RAM 162, and the option numbers are set.

FIG. 23 shows that the function written into the memory 166 has been cleared during the above-mentioned custom function selection operation. Specifically, "CL" indicated by reference character 23 shows that the custom function has been changed to the initial value or initialized.

The process of clearing the custom function is executed when the IF button 112 is pressed during the custom function selection operation.

The display manner is not restricted that of this embodiment. A light emitting device such as an LED may be used as the display means, in place of a display device using a liquid crystal, such as the LCD panel 21.

In the above, the function clear (initialization) process of the function selection process has been described. In this embodiment, similarly, the mode clear (initialization) process may be executed during the mode selection process.

The function clear process will be described with reference to the flowchart shown in FIG. 24. The flowchart shows one of subroutines which are executed by timer interruption of the CPU 161.

When the subroutine is started, the process of checking the main switch 31 is first executed. If the main switch is turned off or both the set switch SW1 and the power switch SW2 are turned off, the control exits from the subroutine without conducting any further process (S501, or S501, S503 and S505). If the set switch SW1 is turned on or if the set switch SW1 and the power switch SW2 are turned on, the following processes are executed.

If the set switch SW1 is turned on but the power switch SW2 is turned off, the control advances from step S505 to step S507 to execute the following process.

The memory 166 is checked to see whether it stores a mode/function or not. If no mode/function is stored, the initial mode is displayed on the LCD panel 21, and the control returns (S507 and S509). This enables photography to be performed in the initial mode.

If a mode/function is stored in the memory 166, the mode/function is called and displayed on the LCD panel 21 (S507, S511 and S513). Then the clear switch 81 is checked to see whether it is turned on or not. If the switch is not turned on, the control returns (S515). This enables photography to be performed in the mode/function stored in the memory 166.

If the clear switch 81 is turned on, the mode/function stored in the memory 166 is cleared, the clear indication "CL" is displayed on the LCD panel 21, and the control waits for the clear switch 81 to be turned off (S515, S517, S519 and S521).

If the clear switch 81 is turned off, the display state of the LCD panel 21 is restored to the normal one, and the control returns (S521 and S523). This enables photography to be performed in the initial mode/function.

If the power switch SW2 is turned on, the mode/function stored in the RAM 162 is called and displayed on the LCD panel 21 (S501, S503 and S531). Then the clear switch 81 is checked to see whether it is turned on or not. If the clear switch 81 is turned off, the control returns (S533). This enables photography to be performed in the mode/function stored in the RAM 162.

If the clear switch 81 is turned on, function options of all the functions are initialized, or data related to the function stored in the RAM 162 are rewritten to the initial values, the clear indication "CL" 23 is displayed on the LCD panel 21, and the control waits for the clear switch 81 to be turned off (S533, S535, S537 and S539). If the clear switch 81 is turned off, the display state of the LCD panel 21 is restored to the normal one, and the control returns (S539 and S541). This enables photography to be performed in the initial value with respect to the function, and in the mode stored in the RAM 162 with respect to the mode.

Next, the second example will be described with reference to FIG. 25. The second example is a step-simplified version of the first example.

When the control enters the subroutine, the set switch SW1 is checked. If the switch is not turned on, the control exits from this process. If the set switch SW1 is turned on, the following processes are executed (S601).

If the set switch SW1 is turned on but the power switch SW2 is not turned on, the following process is executed.

First, the clear switch 81 is checked to see whether it is turned on or not. In the case where the switch is not turned on, if a mode/function is stored in the RAM 166, the mode/function is called and displayed on the LCD panel 21, and the control returns (S605, S607 and S609). If no mode/function is stored, the initial mode/function is called from the ROM to be displayed, and the control returns (S605, S607 and S611).

As a result of the above processes, when a mode/function is stored in the memory 166, photography can be performed in the mode/function, and, when no mode/function is stored, photography can be performed in the initial mode/function.

If the clear switch 81 is turned on, the mode/function stored in the memory 166 is cleared, the clear indication "CL" 23 is displayed on the LCD panel 21, and the control returns (S605, S613 and S615). Since this flowchart is called by timer interruption or another subroutine which is not shown, the processes of steps S601, S603, S605, S613 and S615 are executed during a period when the clear switch 81 is turned on, and the control then returns. If the clear switch 81 is turned off, the initial mode/function is displayed on the LCD panel 21 and the control returns because no mode/function is stored in the memory 166 (S605, S607 and S611).

As a result of the above processes, all the modes/functions stored in the memory 166 are cleared so that photography can be performed in the initial mode/function.

If both the set switch SW1 and the power switch SW2 are turned on, the control advances to step S621 to execute the following processes (S601, S603 and S621).

First, the clear switch 81 is checked to see whether it is turned on or not. If the switch is not turned on, the mode/function (previously used mode) stored in the RAM 162 is displayed on the LCD panel 21, and the control returns (S621 and S623). This enables photography to be performed in the mode/function stored in the RAM 162.

If the clear switch 81 is turned on, function options of all the functions are initialized, or options related to the function stored in the RAM 162 are rewritten to the initial values, the clear indication "CL" 23 is displayed on the LCD panel 21, and the control returns (S621, S625 and S627). During a period when the clear switch 81 is turned on, when the control enters this subroutine, the above-mentioned processes are executed and the clear indication "CL" 23 is kept displayed on the LCD panel 21 (S601, S603, S621, S625 and S627). If the clear switch 81 is turned off, the mode/function stored in the RAM 162 is displayed on the LCD panel 21, and the control returns (S621 and S623).

As a result of the above processes, only data related to the function among the modes/functions stored in the RAM memory 166 are rewritten to the initial function so that photography is performed in the mode/function stored in the RAM 162.

As described above, in this embodiment, changeable modes/functions among modes/functions which can be changed by the photographer can easily be initialized at one time by the photographer. Therefore, the processes of changing and initializing modes/functions can be conducted in a very easy manner.

In steps S517 and S613, the mode/function stored in the memory 166 is cleared. Alternatively, the mode/function stored in the RAM 162 may be initialized. In steps S535 and S625, the function stored in the RAM 162 is rewritten. Alternatively, the function stored in the memory 166 may be rewritten.

The invention is not restricted by the terms, "mode" and "function" which are used in the description of the embodiments. The photographer can allocate the changeable faculties of the camera to the mode and function in an arbitrary manner. For example, faculties which are changed only in a certain special photography may be grouped to be used as functions. Alternatively, faculties which directly affect a photography result, and those which do not affect a photography result may be classified into different groups so that either of the two groups is initialized independently.

The operation button or switch means for initializing a mode/function or a function is not restricted to the clear button 82 or the IF button 112. When only a function is to be initialized, a button other than an operation button for selecting a function may be operated.

As seen from the above description, the camera of the invention includes a mode and function which can be selected from plural modes and functions by the photographer, and the memory means for storing changed modes/functions. A part of or the whole of modes/functions selected in the memory means can be changed at a time to specific initial modes/functions by an operation different from that of selection a mode. Therefore, the processes of changing and initializing modes/functions can be conducted in a very easy manner.

Fourth Embodiment

A fourth embodiment of the invention will be described. The camera body of the single-lens reflex camera of the fourth embodiment, and switches mounted on the camera body, are configured in the same manner as those of the third embodiment described above, and their illustration and description are omitted (see FIGS. 1 to 6, 8 and 16). The control circuit of the fourth embodiment has the same configuration as that of the third embodiment, and its illustration and description are omitted (see FIG. 22).

In this embodiment, when the memory switch 71 is turned on while the power switch SW2 is turned on, all the modes/functions stored in the RAM 162 are written into the memory circuit 165. When the set switch SW1 interlocked with the main switch operating unit 32 is turned on and the power switch SW2 is turned off, the mode/function stored in the memory circuit 165 is called, displayed on the LCD panel 21, and then used in photography. In other words, when the set switch SW1 is turned on, photography is conducted in the memory mode stored in the memory circuit 165, and, when the power switch SW2 is turned on, photography is conducted in the mode stored in the RAM 162 of the CPU 161.

In this embodiment, when the setting button 52 is pressed (turned on) while the power switch SW2 is turned on, the mode/function selected by operating the mode setting dial 42 is set to the change enabled state, and only the corresponding indication on the LCD panel 21 begins to blink. When the AV operating dial 62 is rotated under this state, modes which are selectable among modes in the change enabled state are sequentially changed and displayed on the LCD panel 21. When the setting button 52 is then turned off, the mode displayed on the LCD panel 21 is selected, and stored in the RAM 162 of the CPU 161.

In this embodiment, when the ML button 122 is turned on during the above-mentioned mode/function change process, only modes/functions which have been changed in the previous changing operation are stored in the memory 166, or, when these modes/functions have already been stored, they are rewritten. As a result of this storage or rewriting process, the operation of turning on the set switch SW1 in subsequent processes causes the rewritten modes/functions to be called, displayed and used in photography. With respect to a mode/function which has not been rewritten or written, a mode/function which has been written into the memory 166, or the initial mode/function is called.

The features of the invention will be further described with reference to display manners shown in FIGS. 26 to 28 and a flowchart shown in FIG. 29.

Figure 26:
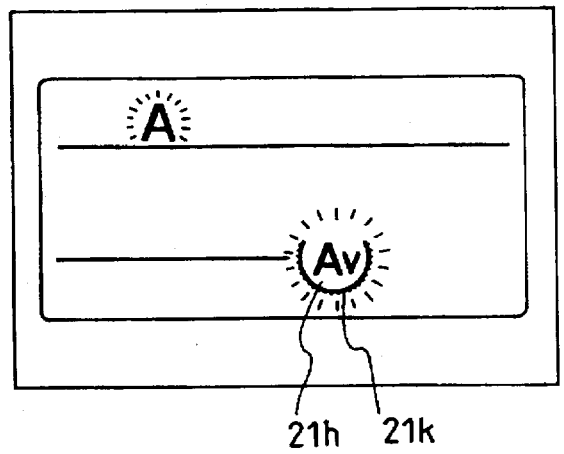
FIG. 26 is a view showing a display manner of a single-lens reflex camera of a fourth embodiment of the invention, in a process of selecting a function.
Figure 27:
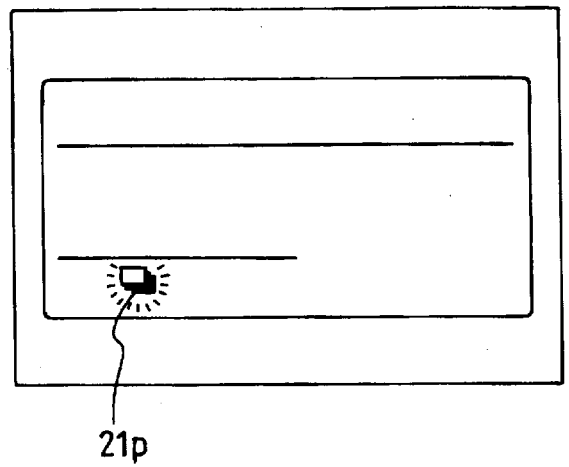
FIG. 27 is a view showing another display manner of the camera in a process of selecting a function.
Figure 28:
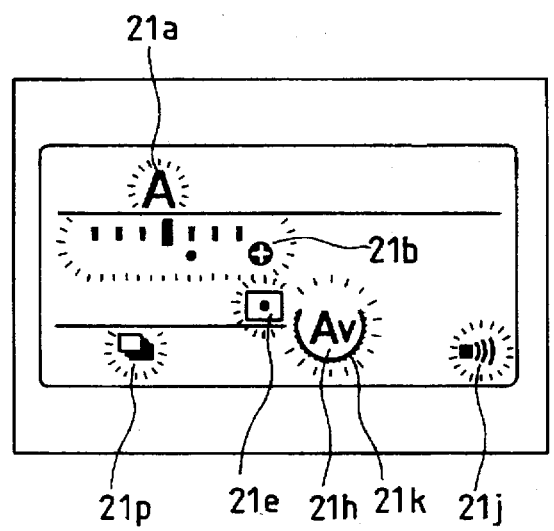
FIG. 28 is a view showing still another display manner of the camera in a process of selecting a function.

FIGS. 26 to 28 show the states in this embodiment where the mode/function is being set. Specifically, FIG. 26 shows that the aperture-priority exposure mode is stored, FIG. 27 shows that the continuous winding (continuous photography) mode is stored, and FIG. 28 shows that the aperture-priority exposure mode, the continuous winding mode, exposure correction of +1 EV, the spot photometric mode, and the electronic sound mode are stored. Reference characters in FIGS. 26 to 28 indicate the same meanings as those used in the embodiments described above.

After the process of setting the mode/function is ended, or if the memory switch 71 is turned off, the blinking state is changed to the continuous lighting state.

As described above, in this embodiment, only the mode/function which the photographer intends to change is separately stored, and the mode/function to be stored is indicated in the storage process by the blinking state so that it is surely known. The display manner and the display means are not restricted to the illustrated LCD panel 21.

Figure 29:
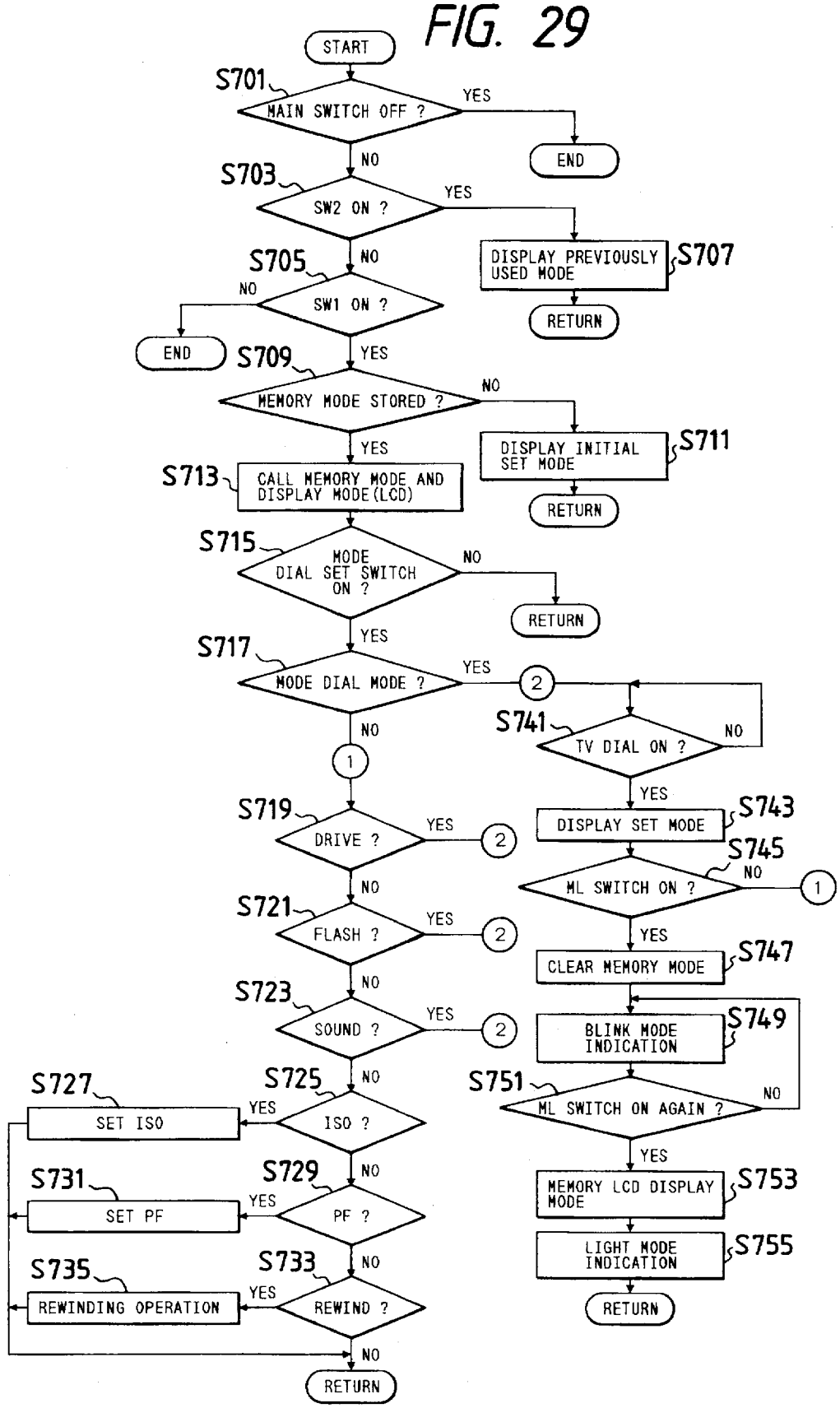
FIG. 29 is a flowchart of an example of a storage mode/function rewrite process of the camera.

FIG. 29 shows an example of the process which is a feature of the invention. This flowchart shows one of the subroutines executed by timer interruption of the CPU 161.

When the subroutine is started, the process of checking the main switch 31 is first executed. If the main switch is turned off or both the set switch SW1 and the power switch SW2 are turned off, the control exits from the subroutine without conducting any further process (S701, or S701, S703 and S705).

If the power switch SW2 is turned on, the mode/function stored in the RAM 162 is called and displayed on the LCD panel 21, and the control returns (S701, S703 and S707). This enables photography to be performed in the mode/function which is selected and set by the photographer.

If only the set switch SW1 is turned on, the processes starting from step S709 are executed. First, the memory 166 is checked to see whether it stores a mode/function or not. If no mode/function is stored, the initial mode/function is called from the ROM and displayed on the LCD panel 21, and the control returns (S709 and S711). This process enables photography to be performed in the initial mode/function when a mode/function set by the photographer is not stored in the memory 166.

If a mode/function is stored in the memory 166, the mode/function is called, and a mode/function which is not stored in the memory 166 is called from the RAM 162. These modes/functions are displayed on the LCD panel 21, and, when the setting switch 51 is turned off, the control returns (S709, S713 and S715). This process allows photography to be performed in the mode/function stored in the memory 166 in place of the mode/function stored in the RAM 162.

If the setting switch 51 is turned on, the process of individually setting modes/functions is executed.

First, it is checked to see to which mode the mode switch 41 is set. If the mode switch 41 is set to the ISO value, the custom function or the rewinding mode, a process similar to the usual process of changing a mode or the like is executed, and the control returns (S717, S719 and S735).

If the mode switch 41 is set to the exposure mode, the drive mode, the flash mode or the electronic sound mode, processes of changing the mode in each mode and rewriting it with the mode written in the memory 166 are executed.

In the rewriting process, the control waits for an operation of rotating the TV operating dial 92. If the TV operating dial 92 is rotated, the mode set by the mode switch 41 is displayed on the LCD panel 21 (S717 to S723, S741 and S743).

Next, the memory switch 71 is checked to see whether it is being turned on or not. If the switch is not being turned on, the control returns to S719 (S745 and S719). If the mode switch 41 is set to the exposure mode, therefore, the control returns through steps S719, S721, S723, S725, S729 and S733, and, when the process is again called by timer interruption or another subroutine, the above-mentioned processes are repeated. If the mode switch is set to the drive mode, the flash mode or the electronic sound mode, the control waits for the turning on of the memory switch 71, and the selection of the modes can be done during the waiting period.

When the memory switch 71 is turned on, all the stored contents of the memory 166 which relate to the corresponding mode are cleared, the mode indication of the LCD panel 21 is caused to blink, and the control waits for when the memory switch 71 is again turned on, other words, when the switch is turned off and then turned on (S745, S747 and S749).

When the memory switch 71 is again turned on, all changed/selected modes displayed on the LCD panel 21 are stored in the memory 166, the blinking state on the LCD panel 21 is changed to the continuous lighting state, and the control then returns (S751, S753 and S755).

As a result of the process described above, only a mode/function which is newly selected is stored in the memory 166. Since the operation of lighting—blinking—lighting is conducted on the LCD panel 21, furthermore, the photographer can surely know that a mode/function has been newly stored in the memory 166.

As described above, in this embodiment, the process of storing all modes/functions stored in the RAM 162 used in usual display and photography is not conducted on the memory 166, which is disposed separately from the RAM 162. At any time during the process of selecting a mode/function, the memory 166 can be rewritten with respect to a changed mode/function only. Therefore, the photographer can select and change only a mode/function to be changed, and cause only the mode/function to be stored, by pressing the ML button 122.

Consequently, photography can be performed by using modes/functions stored in the memory 166 along with modes/functions which are stored in the RAM 162 and usually used.

In this embodiment, during the process of selecting a mode/function, the selected mode/function is stored in the memory means 166, and the photographer is notified of the storage of the mode/function and the completion of the storage process by means of the first and second display manners, i.e., blinking and lighting. The invention is not restricted to this configuration.

As seen from the above description, according to the invention, one or more desired modes/functions among plural modes/functions which are currently used are separately stored, and the separately stored modes/functions can be called at a desired time so that the mode/function is used in place of a corresponding usual mode/function. Therefore, operations of switching and correcting a mode/function, etc. can easily be conducted.

Fifth Embodiment

A fifth embodiment of the invention will be described. In the fifth embodiment, portions similar to those of the first embodiment are designated by the same reference characters, and their description is omitted.

Figure 30:
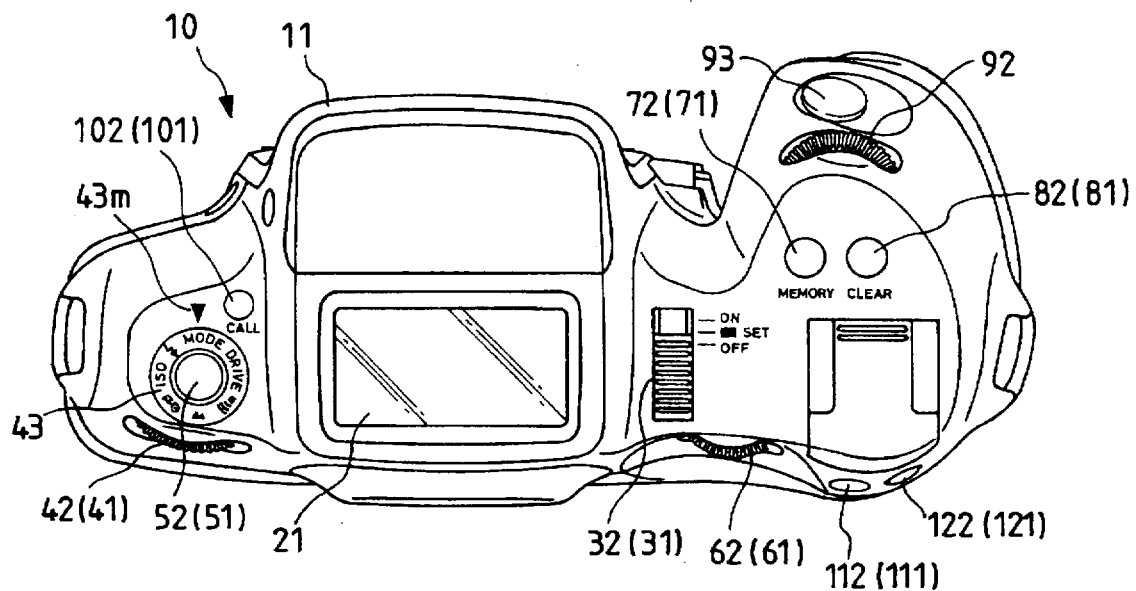
FIG. 30 is a plan view of the camera body of a single-lens reflex camera of a fifth embodiment of the invention, as seen from the photographer.

FIG. 30 is a plan view of the camera body of a single-lens reflex camera of the fifth embodiment of the invention, as seen from the photographer.

In FIG. 30, the call switch button 102 of the call switch 101 for calling a stored mode is disposed in front of the mode setting dial 42 and the indication ring 43. The IF button 112 of the IF switch 111, and the ML button 122 of the ML switch 121 for locking the exposure level are mounted in the side of the AV operating dial 62. The IF switch 111 and the ML switch 121 are configured in the same manner as those of the second embodiment described above (see FIG. 16).

Figure 31:
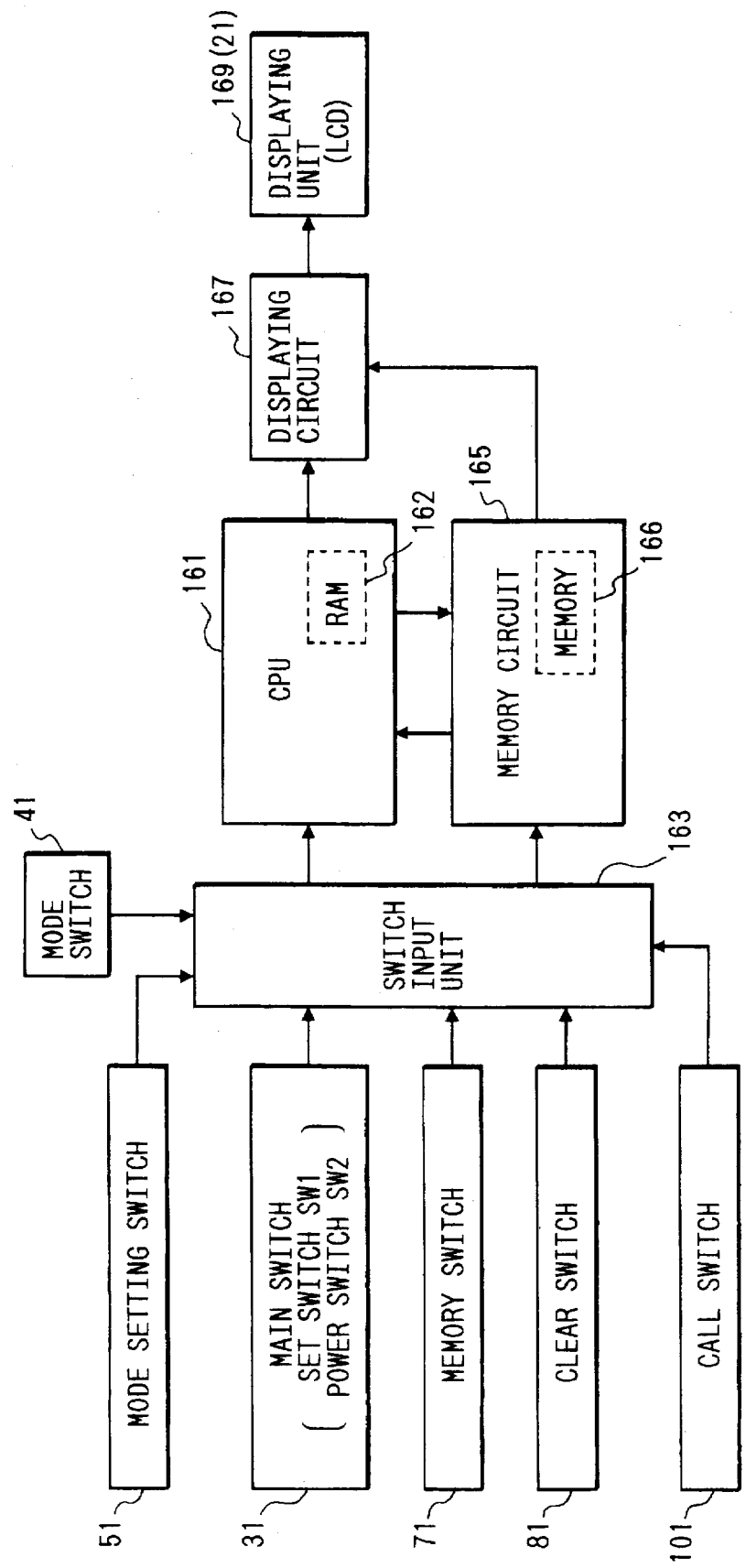
FIG. 31 is a block diagram showing an example of the circuit configuration of the camera.

The mechanical configuration of the camera body 10 of the single-lens reflex camera of the fifth embodiment of the invention has been described. The configuration of a control circuit of the camera will be described with reference to a block diagram of FIG. 31 showing the main portion.

The main switch 31 (the set switch SW1 and the power switch SW2), the mode switch 41, the setting switch 51, the memory switch 71, the clear switch 81 and the call switch 101 are connected to the switch input unit 163. The switch input unit 163 can detect the ON/OFF states of the switches 31, 41, 51, 71, 81 and 101. Although not shown, also other switches and the like are connected to the switch input unit 163. The other portions of the control circuit have the same configuration as the first embodiment described above.

In this embodiment, when the set switch SW1 interlocked with the main switch operating unit 32 is turned on and the power switch SW2 is turned off, the mode/function stored in the memory circuit 165 is called, displayed on the LCD panel 21, and then used in photography. In other words, when the set switch SW1 is turned on, photography is conducted in the mode stored in the memory circuit 165, and, when the power switch SW2 is turned on, photography is conducted in the mode stored in the RAM 162 of the CPU 161.

When the setting button 52 is pressed (turned on) while the power switch SW2 is turned on, the mode/function selected by operating the mode setting dial 42 is set to the change enabled state, and only the corresponding indication on the LCD panel 21 begins to blink. When the AV operating dial 62 is rotated under this state, modes which are selectable among modes in the change enabled state are sequentially changed and displayed on the LCD panel 21. When the setting button 52 is then turned off, the mode/function displayed on the LCD panel 21 is selected, and stored in the RAM 162 of the CPU 161.

In this embodiment, when the set switch SW1 is turned on, the process of selecting a mode/function can be conducted in the same manner as that conducted when the power switch SW2 is being turned on. When the memory button 72 is turned on as described above during the process of selecting a mode/function under the state where the set switch SW1 is turned on, the displayed mode/function is written into the memory 166. Each time when the memory button 72 is further turned on, the displayed mode/function is written into different areas of the memory 166. In other words, plural combinations of modes/functions can be stored.

Any of the different combinations of modes/functions stored in the memory 166 can be selected, called and displayed by turning on the call button 102 while the set switch SW1 is turned on. The selected combination is used in photography.

The features of the invention will be further described with reference to display manners shown in FIGS. 32 and 33 and a flowchart shown in FIG. 34.

Figure 32:
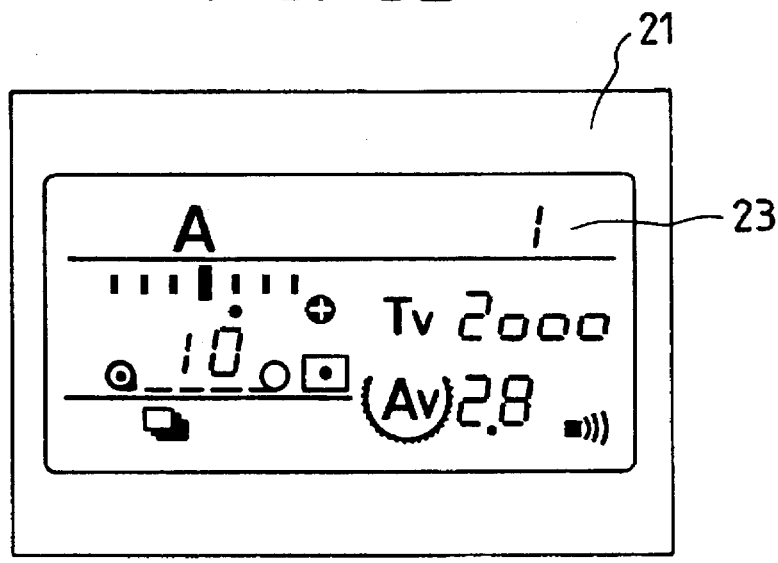
FIG. 32 is a view showing a display manner in the case where modes/functions of mode number 1 are called.
Figure 33:
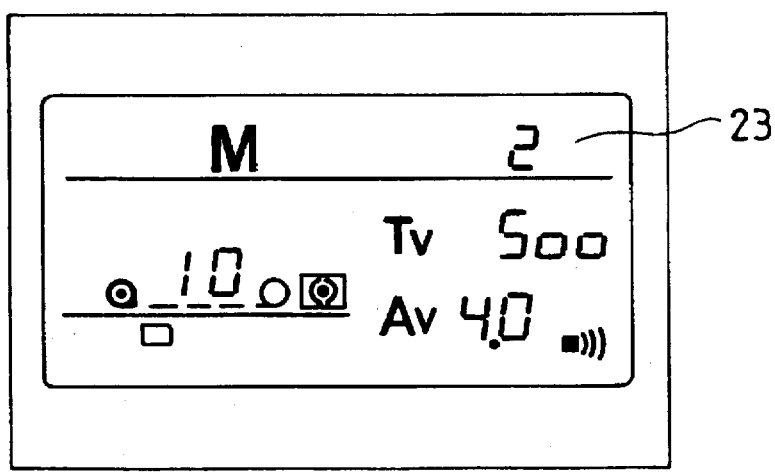
FIG. 33 is a view showing a display manner in the case where modes/functions of mode number 2 are called.

FIGS. 32 and 33 show features of this embodiment. Specifically, FIG. 32 shows a combination of modes/functions which has mode number (identification number) 1 and is stored in the memory 166, and FIG. 33 shows a combination of modes/functions which has mode number 2. In the figures, a display element designated by reference character 23 indicates a mode number (identification number). As shown in FIG. 18, the display element can display also the ISO value.

The single-lens reflex camera has the following feature. In the description below, it is assumed that the photographer starts to operate a camera on which the operation of storing a mode/function has not yet been conducted.

The operating unit 32 of the main switch 31 is moved to the second position to turn on the set switch SW1. Then the initial mode/function is displayed on the LCD panel 21. Photography can be conducted in the displayed mode/function.

The photographer operates the mode setting dial 42, the setting button 52, the AV operating dial 62 and the TV operating dial 92 to select one or more modes/functions which are to be stored. The selected modes/functions are displayed on the panel 21. For example, the modes/functions shown in FIG. 10 are selected.

When the photographer presses the memory button 72 under this state, the combination of the modes/functions displayed on the panel 21 is written as one set into an area of the memory 166 which is identified by mode number 1. On the panel 21, mode number 1 of the combination is displayed by the display element 23.

When the photographer releases the memory button 72, the display of mode number 1 in the display of the panel 21 goes off and photography can be conducted in the displayed modes/functions.

When the photographer further selects modes/functions to be stored and presses the memory button 72, mode number 2 is displayed as shown in, for example, FIG. 33, and the newly selected modes/functions are written into the memory 166 as modes/functions of mode number 2. In other words, the newly selected modes/functions are stored in the memory 166 as a combination set different from the set of mode number 1.

When a mode of a mode number written into the memory 166 is to be called, the call button 102 is pressed while the set switch SW1 is turned on. Then modes/functions displayed on the panel 21 are changed, and a mode number is displayed. In other words, modes/functions of a mode number which is subsequent to the mode number obtained before the change are displayed. When the call button 102 is further pressed, the mode number and modes/functions are changed.

When the call button 102 is released, the display of the mode number goes off and the display state returns to the normal one so that photography is conducted in the displayed modes/functions.

Figure 34:
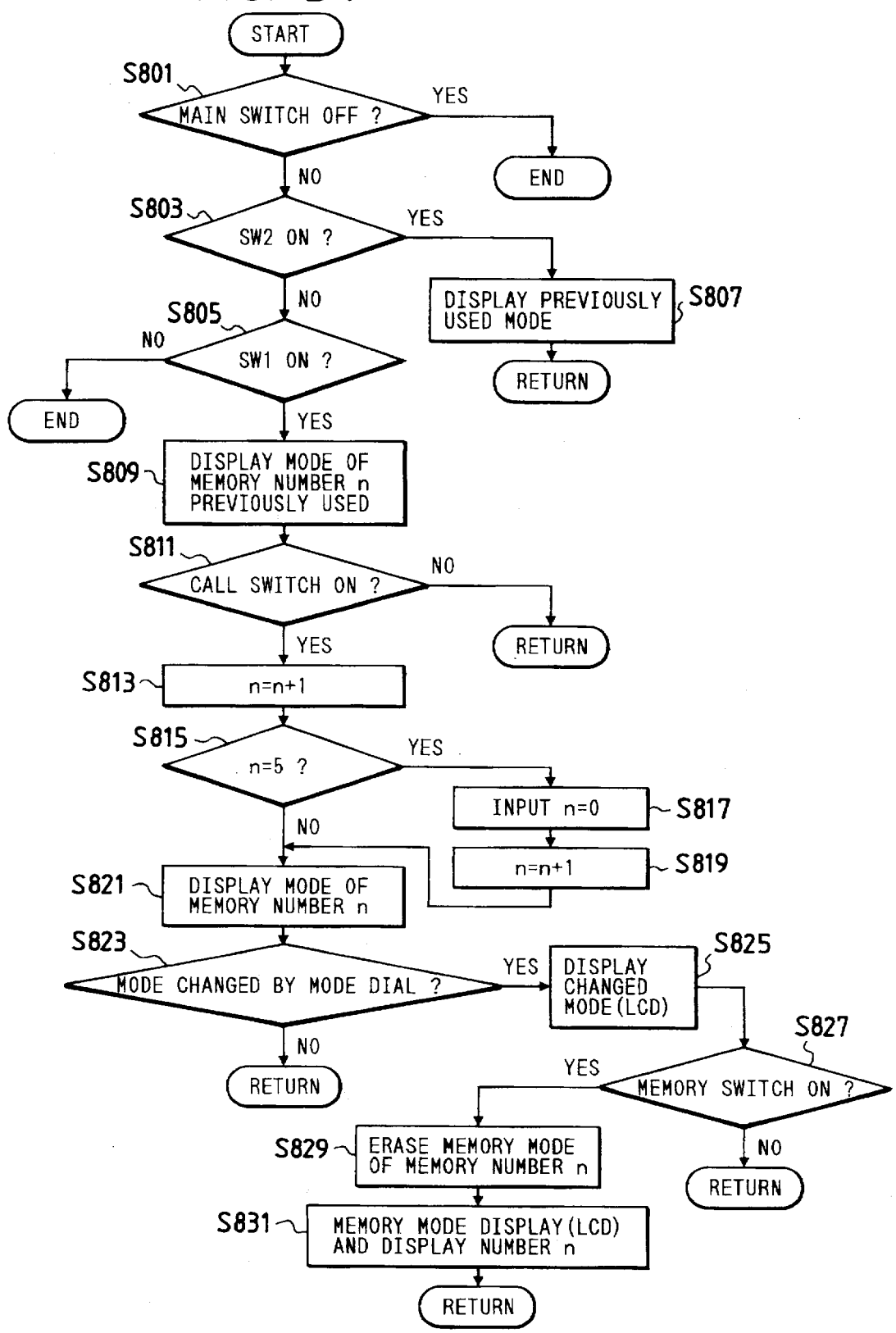
FIG. 34 is a flowchart of an example of storage mode/function call, and storage processes of the camera.

FIG. 34 shows an example of the process which is a feature of the invention. This flowchart shows one of the which are executed by timer interruption of the CPU 161.

When the subroutine is started, the main switch 31 is first checked to see whether it is turned off or not. If the main switch is turned off or both the set switch SW1 and the power switch SW2 are turned off, the control exits from the subroutine without conducting any further process (S801, or S801, S803 and S805).

If the power switch SW2 is turned on, the mode/function stored in the RAM 162 is called and displayed on the LCD panel 21, and the control returns (S801, S803 and S807). This enables photography to be performed in the mode/function which is selected and set by the photographer.

If the set switch SW1 is turned on but the power switch SW2 is turned off, the processes starting from step S809 are executed. First, the mode/function which is stored in the RAM 162 and corresponds to memory number n is displayed on the LCD panel 21. If the call switch 101 is not turned on, the control returns (S809 and S811). As a result of the above-mentioned display process, photography can be performed in the mode/function which is attained before the set switch SW1 is turned on or before the control enters the subroutine. When the memory number n is 1, for example, "1" is displayed by the display element 23 as shown in FIG. 33, and the modes/functions stored as mode number 1 are displayed. Photography can be conducted in the displayed modes/functions.

If the call switch 101 is turned on, memory number n is incremented by 1. The mode/function group corresponding to the incremented memory number is read out from the RAM 162, and displayed on the LCD panel 21 (S813, S815 and S821). For example, the display shown in FIG. 23 is attained.

If memory number n reaches 5, a process of returning the memory number to 1 is executed (S815, S817 and S819). In this embodiment, namely, five mode/function groups can be stored.

Next, it is checked to see whether the mode has been changed by operating the mode setting switch or not. If the mode has not been changed, the control returns (S823).

If the mode has been changed, the changed mode is displayed. If the memory switch 71 is not turned on, the control returns (S823, S825 and S827).

If the memory switch 71 is being turned on, the modes/functions of memory number n which were displayed in step S821 are erased, the currently displayed modes/functions are stored at mode number n, the mode number is displayed, and the control returns (S827, S829 and S831). In step S821, for example, the display process is conducted as follows. In the case where the mode number is 1 and its modes/functions are those shown in FIG. 10, when the modes/functions are changed to those shown in FIG. 11, the display is done as shown in FIG. 32.

As a result of the processes described above, the changed modes/functions can be written into the area of mode number n. Then modes/functions of desired number n can be called by turning on the call button 102 while the set switch SW1 is turned on.

As described above, in this embodiment, the photographer can previously set plural combinations of desired modes/functions in accordance with photographic circumstances, and easily recall any of them as required. Therefore, photography in accordance with photographic circumstances can rapidly be performed. Furthermore, also a mode number for identifying the selected modes/functions is displayed on the panel 21, and hence the photographer can easily select a combination of desired modes/functions.

As seen from the above description, according to the invention, plural combinations of modes/functions which are set by the photographer can be stored and called. In a photographic process, therefore, the photographer can rapidly set a combination of desired modes/functions and perform photography by using it.

What is claimed is:

1. A camera comprising:
   a main switch, having an on position and an off position, for turning on/off a power supply;
   a first memory means for storing a mode/function which is selected from a plurality of changeable modes/functions, said plurality of modes/functions defining the photographic parameters of said camera;
   second memory means for storing the changeable modes/functions separately from said first memory means; and
   a mode call switch for calling the mode/function stored in said second memory means, said mode call switch being interlocked with said main switch such that said main switch cannot be placed in said on position without first operating said mode call switch.

2. A camera comprising:
   a main switch, having an on position and an off position, for turning on/off a power supply;
   a first memory means for storing a mode/function which is selected from a plurality of changeable modes/functions, said plurality of modes/functions defining the photographic parameters of said camera;
   second memory means for storing the mode/function stored in said first memory means, separately from said first memory means;
   memory switch means for writing the mode/function stored in said first memory means, into said second memory means;
   a mode call switch for calling the mode/function stored in said second memory means, said mode call switch being interlocked with said main switch such that said main switch cannot be placed in said on position without first operating said mode call switch; and
   control means for, when the mode/function is called from said second memory means in response to an operation of said mode call switch, executing a photographic process on the basis of the called mode/function, and for, when the call is not done, executing a photographic process on the basis of the mode/function stored in said first memory means.

3. The camera according to claim 2, wherein an initial mode/function of the changeable modes/functions is stored in said first memory means or said second memory means, and, when said call switch is turned on under the state where the initial mode/function is unchanged, the initial mode/function is called.

4. The camera according to claim 2, wherein said main switch has a first state where said call switch and the power supply are turned off, a second state where said call switch is turned on, and a third state where the power supply is turned on.

5. The camera according to claim 4, wherein, when said main switch is in the third state, said camera operates in the mode/function called from said first memory means, and, when said main switch is in the second state, said camera operates in the mode/function called from said second memory means.

6. The camera according to claim 5, further comprising clear switch means for clearing the mode/function stored in said second memory means.

7. The camera according to claim 6, wherein, when 2 said clear switch means is turned on under the state where said main switch is in the second state, said control means clears the mode/function stored in said second memory means.

8. The camera according to claim 4, wherein, when said memory switch means is turned on under the state where said main switch is in the third state, said control means writes the mode/function stored in said first memory means, into said second memory means.

9. The camera according to claim 4, wherein said main switch is a slide switch, which includes an operating unit which is slidable to either of the first, second and third states.

10. The camera according to claim 4, wherein said main switch is a rotary switch, which includes an operating unit which is rotatable to either of the first, second and third states.

11. A camera comprising:
    mode selection means for selecting a mode/function from a plurality of changeable modes/functions, said plurality of modes/functions defining the photographic parameters of said camera;
    first memory means for storing the mode/function selected by said mode selection means, as a mode/function to be used in taking a picture;
    second memory means for storing the mode/function stored in said first memory means, separately from said first memory means; and
    control means for conducting a storage operation on said second memory means during a selection process conducted by said mode selection means.

12. The camera according to claim 11, wherein said control means conducts the storage operation on said second memory means, while an operation of setting a mode/function having a low priority in a photographic process is conducted.

13. The camera according to claim 11, further comprising an operation member which, in response to an external operation, causes said control means to execute the storage operation on said second memory means.

14. The camera according to claim 13, wherein said operation member is a lock button which locks an exposure value.

15. The camera according to claims 11, further comprising call means for calling the mode/function stored in said second memory means, as a mode/function to be used in photography.

16. A camera comprising:
    mode selection means for selecting a mode/function from a plurality of changeable modes/functions, said plurality of modes/functions defining the photographic parameters of said camera;
    memory means for storing the mode/function selected by said mode selection means and for storing a previously stored specific initial mode/function; and rewrite means for rewriting a part of or the whole of the mode/function stored in said memory means as a replacement for a respective part of said specific initial mode/function.

17. The camera according to claim 16, wherein said rewrite means comprises changeover switch means for switching a rewrite mode from a partial rewrite mode to a whole rewrite mode or vice versa.

18. The camera according to claim 16, wherein the changeable modes/functions are classified into two groups, the modes/functions of one group are rewritten to the initial modes/functions in a manner isolated from the modes/functions of the other group, and the modes/functions of the other group are rewritten to the initial modes/functions together with the modes/functions of the one group.

19. The camera according to claim 17, wherein said changeover switch means is interlocked with main switch means, having an on position and an off position, for turning on/off a power supply to electrical parts of said camera such that said main switch cannot be placed in said on position without first operating said changeover switch.

20. The camera according to claim 16, further comprising clear switch means, said clear switch means comprising first switch means for, in response to an external operation, causing said rewrite means to execute the rewriting process.

21. The camera according to claim 20, wherein said clear switch means further comprises second switch means which executes a second function.

22. The camera according to claim 21, wherein, during a period when said mode selection means conducts a process of changing the part of modes/functions, said second switch means of said clear switch means executes said second function.

23. A camera comprising:
mode selection means for selecting a mode/function from plurality of changeable modes/functions, said plurality of modes/functions defining the photographic parameters of said camera;
first memory means for storing the mode/function selected by said mode selection means, as a mode/function to be used in taking a picture;
second memory means for storing the mode/function stored in said first memory means, separately from said first memory means;
call means for calling the mode/function stored in said second memory means, to use the called mode/function in taking a picture; and
rewrite means for rewriting a part of or the whole of the mode/function stored in said second memory means as a replacement for a respective part of a specific initial mode/function.

24. The camera according to claim 23, wherein said rewrite means comprises changeover switch means for switching a rewrite mode from a partial rewrite mode to a whole rewrite mode or vice versa.

25. The camera according to claim 23, wherein the changeable modes/functions are classified into two groups by said mode selection means, the modes/functions of one group are rewritten to the initial modes/functions in a manner isolated from the modes/functions of the other group, and the modes/functions of the other group are rewritten to the initial modes/functions together with the modes/functions of the one group.

26. The camera according to claim 24, wherein said changeover switch means is interlocked with main switch means, having an on position and an off position, for turning on/off a power supply to electrical parts of said camera such that said main switch cannot be placed in said on position without first operating said changeover switch.

27. The camera according to claim 23, further comprising clear switch means, said clear switch means comprising first switch means for, in response to an external operation, causing said rewrite means to execute the rewriting process.

28. The camera according to claim 27, wherein said clear switch means further comprises second switch means which executes a second function.

29. The camera according to claim 28, wherein, during a period when said mode selection means conducts a process of changing the part of modes/functions, said second switch means of said clear switch means executes said second function.

30. A camera comprising:
mode selection means for selecting one or more modes/functions from a plurality of changeable modes/functions, said plurality of modes/functions defining the photographic parameters of said camera;
memory means for storing one or more modes/functions selected by said mode selection means; and
control means for causing said memory means to store only one or more changed modes/functions during a period when said mode selection means conducts a mode/function selection process.

31. A camera comprising:
mode selection means for selecting a mode/function from plurality of changeable modes/functions, said plurality of modes/functions defining the photographic parameters of said camera;
first memory means for storing the mode/function selected by said mode selection means, as a mode/function to be used in taking a picture;
second memory means for storing the mode/function stored in said first memory means, separately from said first memory means;
control means for causing said second memory means to store only one or more changed modes/functions during a period when said mode selection means conducts a mode/function selection process; and
switch means for, in response to an external operation, causing said control means to execute the storage operation.

32. The camera according to claim 31, further comprising display means for displaying the mode/function stored in said second memory means, wherein said display means displays only the selected mode/function during a period when said mode selection means conducts a mode/function selection process.

33. The camera according to claim 32, wherein, when said switch means is externally operated, said control means causes said second memory means to store a mode/function which is currently selected by said mode selection means, changes a display mode of said display means from a first manner to a second manner, and, after the storage process is ended, returns the display mode to the first manner.

34. The camera according to claim 33, wherein the first manner of said display means is a lighting state, and the second manner is a blinking state.

35. The camera according to claim 33, wherein, when said switch means is again operated, said control means returns the display to the first manner.

36. The camera according to claim 31, further comprising call means for calling the mode/function stored in said second memory means, to use the called mode/function in photography in preference to the mode/function stored in said first memory means.

37. A camera comprising:
   mode selection means for, in response to an external operation, changing a plurality of changeable modes/functions, said plurality of modes/functions defining the photographic parameters of said camera;
   memory means for independently storing a plurality of combinations of modes/functions selected by said mode selection means; and
   call means for alternatively calling the combinations of modes/functions stored in said memory means.

38. A camera comprising:
   mode selection means for selecting a mode/function from a plurality of changeable modes/functions, said plurality of modes/functions defining the photographic parameters of said camera;
   first memory means for storing the mode/function selected by said mode selection means, as a mode/function to be used in taking a picture;
   second memory means for independently storing a plurality of combinations of modes/functions selected by said mode selection means; and
   call means for alternatively calling the combinations of modes/functions stored in said second memory means in the unit of a combination, as modes/functions to be used in taking a picture.

39. The camera according to claim 38, wherein said memory means comprises display means for displaying the mode/function called by said call means.

40. The camera according to claim 39, wherein said display means comprises a display element which indicates the combination of mode/function which is called and indicated, as distinguished from another combination.

41. The camera according to claim 40, wherein said display means conducts the indication by using a display element used exclusively for indicating said combination of mode/function which is called.

42. A camera comprising:
   a main switch, having an on position and an off position, for turning on/off a power supply;
   a first memory for storing a mode/function which is selected from a plurality of changeable modes/functions, said plurality of modes/functions defining the photographic parameters of said camera;
   a second memory for storing the changeable modes/functions separately from said first memory; and
   a mode call switch for calling the mode/function stored in said second memory, said mode call switch being interlocked with said main switch such that said main switch cannot be placed in said on position without first operating said mode call switch.

43. A camera comprising:
   a main switch, having an on position and an off position, for turning on/off a power supply;
   a first memory for storing a mode/function which is selected from a plurality of changeable modes/functions, said plurality of modes/functions defining the photographic parameters of said camera;
   a second memory for storing the mode/function stored in said first memory, separately from said first memory;
   a memory switch for writing the mode/function stored in said first memory, into said second memory;
   a mode call switch for calling the mode/function stored in said second memory, said mode call switch being interlocked with said main switch such that said main switch cannot be placed in said on position without first operating said mode call switch; and
   a controller for, when the mode/function is called from said second memory in response to an operation of said mode call switch, executing a photographic process on the basis of the called mode/function, and for, when the call is not done, executing a photographic process on the basis of the mode/function stored in said first memory.

44. The camera according to claim 43, wherein an initial mode/function of the changeable modes/functions is stored in said first memory or said second memory, and, when said call switch is turned on under the state where the initial mode/function is unchanged, the initial mode/function is called.

45. The camera according to claim 43, wherein said main switch has a first state where said call switch and the power supply are turned off, a second state where said call switch is turned on, and a third state where the power supply is turned on.

46. The camera according to claim 45, wherein, when said main switch is in the third state, said camera operates in the mode/function called from said first memory, and, when said main switch is in the second state, said camera operates in the mode/function called from said second memory.

47. The camera according to claim 46, further comprising a clear switch for clearing the mode/function stored in said second memory.

48. The camera according to claim 47, wherein, when said clear switch is turned on under the state where said main switch is in the second state, said controller clears the mode/function stored in said second memory.

49. The camera according to claim 45, wherein, when said memory switch is turned on under the state where said main switch is in the third state, said controller writes the mode/function stored in said first memory, into said second memory.

50. The camera according to claim 45, wherein said main switch is a slide switch, which includes an operating unit which is slidable to either of the first, second and third states.

51. The camera according to claim 45, wherein said main switch is a rotary switch, which includes an operating unit which is rotatable to any of the first, second and third states.

52. A camera comprising:
   a mode selector for selecting a mode/function from a plurality of changeable modes/functions, said plurality of modes/functions defining the photographic parameters of said camera;
   a first memory for storing the mode/function selected by said mode selector, as a mode/function to be used in taking a picture;
   a second memory for storing the mode/function stored in said first memory, separately from said first memory; and
   a controller for conducting a storage operation on said second memory during a selection process conducted by said mode selector.

53. The camera according to claim 52, wherein said controller conducts the storage operation on said second memory, while an operation of setting a mode/function having a low priority in a photographic process is conducted.

54. The camera according to claim 52, further comprising an operation member which, in response to an external operation, causes said controller to execute the storage operation on said second memory.

55. The camera according to claim 54, wherein said operation member is a lock button which locks an exposure value.

56. The camera according to claim 52, further comprising a call switch for calling the mode/function stored in said second memory as a mode/function to be used in photography.

57. A camera comprising:
- a mode selector for selecting a mode/function from a plurality of changeable modes/functions, said plurality of modes/functions defining the photographic parameters of said camera;
- a memory for storing the mode/function selected by said mode selector and for storing a previously stored specific initial mode/function; and
- a rewriter for rewriting a part of or the whole of the mode/function stored in said memory as a replacement for a respective part of said specific initial mode/function.

58. The camera according to claim 57, wherein said rewriter comprises a changeover switch for switching a rewrite mode from a partial rewrite mode to a whole rewrite mode or vice versa.

59. The camera according to claim 57, wherein the changeable modes/functions are classified into two groups, the modes/functions of one group are rewritten to the initial modes/functions in a manner isolated from the modes/functions of the other group, and the modes/functions of the other group are rewritten to the initial modes/functions together with the modes/functions of the one group.

60. The camera according to claim 58, wherein said changeover switch is interlocked with a main switch, having an on position and an off position, for turning on/off a power supply to electrical parts of said camera such that said main switch cannot be placed in said on position without first operating said changeover switch.

61. The camera according to claim 57, further comprising a clear switch, said clear switch comprising a first switch for, in response to an external operation, causing said rewriter to execute the rewriting process.

62. The camera according to claim 61, wherein said clear switch further comprises a second switch which executes a second function.

63. The camera according to claim 62, wherein, during a period when said mode selector conducts a process of changing the part of modes/functions, said second switch of said clear switch executes said second function.

64. A camera comprising:
- a mode selector for selecting a mode/function from a plurality of changeable modes/functions, said plurality of modes/functions defining the photographic parameters of said camera;
- a first memory for storing the mode/function selected by said mode selector, as a mode/function to be used in taking a picture;
- a second memory for storing the mode/function stored in said first memory, separately from said first memory;
- a call switch for calling the mode/function stored in said second memory, to use the called mode/function in taking a picture; and
- a rewriter for rewriting a part of or the whole of the mode/function stored in said second memory means as a replacement for a respective part of a specific initial mode/function.

65. The camera according to claim 64, wherein said rewriter comprises a changeover switch for switching a rewrite mode from a partial rewrite mode to a whole rewrite mode or vice versa.

66. The camera according to claim 64, wherein the changeable modes/functions are classified into two groups by said mode selector, the modes/functions of one group are rewritten to the initial modes/functions in a manner isolated from the modes/functions of the other group, and the modes/functions of the other group are rewritten to the initial modes/functions together with the modes/functions of the one group.

67. The camera according to claim 65, wherein said changeover switch is interlocked with a main switch, having an on position and an off position, for turning on/off a power supply to electrical parts of said camera such that said main switch cannot be placed in said on position without first operating said changeover switch.

68. The camera according to claim 64, further comprising a clear switch, said clear switch comprising a first switch for, in response to an external operation, causing said rewriter to execute the rewriting process.

69. The camera according to claim 68, wherein said clear switch further comprises a second switch which executes a second function.

70. The camera according to claim 69, wherein, during a period when said mode selector conducts a process of changing the part of modes/functions, said second switch of said clear switch executes said second function.

71. A camera comprising:
- a mode selector for selecting one or more modes/functions from a plurality of changeable modes/functions, said plurality of modes/functions defining the photographic parameters of said camera;
- a memory for storing one or more modes/functions selected by said mode selector; and
- a controller for causing said memory to store only one or more changed modes/functions during a period when said mode selector conducts a mode/function selection process.

72. A camera comprising:
- a mode selector for selecting a mode/function from a plurality of changeable modes/functions, said plurality of modes/functions defining the photographic parameters of said camera;
- a first memory for storing the mode/function selected by said mode selector, as a mode/function to be used in taking a picture;
- a second memory for storing the mode/function stored in said first memory, separately from said first memory;
- a controller for causing said second memory to store only one or more changed modes/functions during a period when said mode selector conducts a mode/function selection process; and
- a switch for, in response to an external operation, causing said controller to execute the storage operation.

73. The camera according to claim 72, further comprising a display for displaying the mode/function stored in said second memory, wherein said display displays only the selected mode/function during a period when said mode selector conducts a mode/function selection process.

74. The camera according to claim 73, wherein, when said switch is externally operated, said controller causes said second memory to store a mode/function which is currently selected by said mode selector, changes a display mode of said display from a first manner to a second manner, and, after the storage process is ended, returns the display mode to the first manner.

75. The camera according to claim 74, wherein the first manner of said display is a lighting state, and the second manner is a blinking state.

76. The camera according to claim 74, wherein, when said switch is again operated, said controller returns the display to the first manner.

77. The camera according to claim 72, further comprising a call switch for calling the mode/function stored in said second memory, to use the called mode/function in photography in preference to the mode/function stored in said first memory.

78. A camera comprising:
- a mode selector for, in response to an external operation, changing a plurality of changeable modes/functions, said plurality of modes/functions defining the photographic parameters of said camera;
- a memory for independently storing a plurality of combinations of modes/functions selected by said mode selector; and
- a call switch for alternatively calling the combinations of modes/functions stored in said memory.

79. A camera comprising:
- a mode selector for selecting a mode/function from a plurality of changeable modes/functions, said plurality of modes/functions defining the photographic parameters of said camera;
- a first memory for storing the mode/function selected by said mode selector, as a mode/function to be used in taking a picture;
- a second memory for independently storing a plurality of combinations of modes/functions selected by said mode selector; and
- a call switch for alternatively calling the combinations of modes/functions stored in said second memory in the unit of a combination, as modes/functions to be used in taking a picture.

80. The camera according to claim 79, further comprising a display for displaying the mode/function called by said call switch.

81. The camera according to claim 80, wherein said display comprises a display element which indicates the combination of mode/function which is called and indicated, as distinguished from another combination.

82. The camera according to claim 81, wherein said display conducts the indication by using a display element used exclusively for indicating said combination of mode/function which is called.

* * * * *